United States Patent
Schultz et al.

(10) Patent No.: US 8,326,998 B2
(45) Date of Patent: Dec. 4, 2012

(54) MULTIMEDIA PERSONAL ASSISTANT

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 342 days.

(21) Appl. No.: 11/961,339

(22) Filed: Dec. 20, 2007

(65) Prior Publication Data
US 2009/0164640 A1      Jun. 25, 2009

(51) Int. Cl.
*G06F 15/16*      (2006.01)

(52) U.S. Cl. .... 709/228; 709/227; 455/413; 370/395.42

(58) Field of Classification Search ............ 709/227, 709/228; 455/413; 370/395.42
See application file for complete search history.

(56) References Cited

U.S. PATENT DOCUMENTS

| | | | | |
|---|---|---|---|---|
| 7,167,899 B2 * | 1/2007 | Lee et al. | ................ | 709/204 |
| 7,333,496 B1 * | 2/2008 | Patel et al. | ................ | 370/395.42 |
| 7,454,000 B1 * | 11/2008 | Henderson | ................ | 379/142.04 |
| 7,568,213 B2 * | 7/2009 | Carhart et al. | ................ | 725/86 |
| 2002/0087704 A1 * | 7/2002 | Chesnais et al. | ................ | 709/228 |
| 2002/0147777 A1 * | 10/2002 | Hackbarth et al. | ................ | 709/205 |
| 2003/0093480 A1 * | 5/2003 | Lagarde et al. | ................ | 709/206 |
| 2005/0163108 A1 * | 7/2005 | Moore et al. | ................ | 370/352 |
| 2006/0041474 A1 * | 2/2006 | Westling et al. | ................ | 705/14 |
| 2006/0085521 A1 * | 4/2006 | Sztybel | ................ | 709/219 |
| 2006/0174350 A1 * | 8/2006 | Roever et al. | ................ | 726/27 |
| 2007/0050463 A1 * | 3/2007 | Shaffer et al. | ................ | 709/207 |
| 2008/0051066 A1 * | 2/2008 | Bandhole et al. | ................ | 455/413 |

* cited by examiner

*Primary Examiner* — Moustafa M Meky
*Assistant Examiner* — Michael C Lai

(57) ABSTRACT

A system receives, when a multimedia component is operating in a first identity, a first communication request from a first user. The first communication request includes a voice session establishment request or a video session establishment request. The system provides, in response to receiving the first communication request, first multimedia content to the first user based on the first identity and an identifier associated with the first user. The system further receives, when the multimedia component is operating in the first identity, a second communication request from a second, different user. The second communication request includes a voice session establishment request or a video session establishment request. The system provides, in response to receiving the second communication request, second, different multimedia content to the second, different user based on the first identity and an identifier associated with the second, different user.

18 Claims, 28 Drawing Sheets

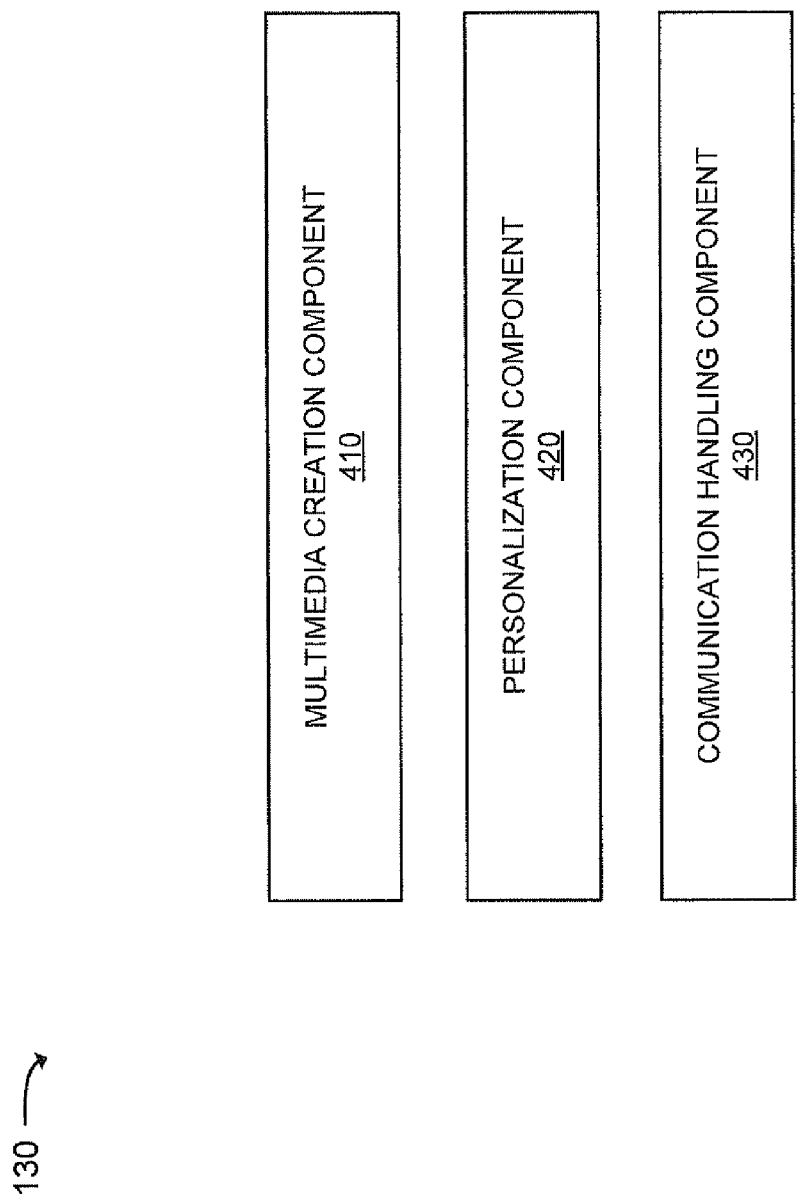

FIG. 5B

| STATUS 520 | RULES 525 |
|---|---|
| ONLINE | RULES |
| OFFLINE | RULES |
| AWAY | RULES |
| BUSY | RULES |
| ... | ... |
| STATUS | RULES |

515

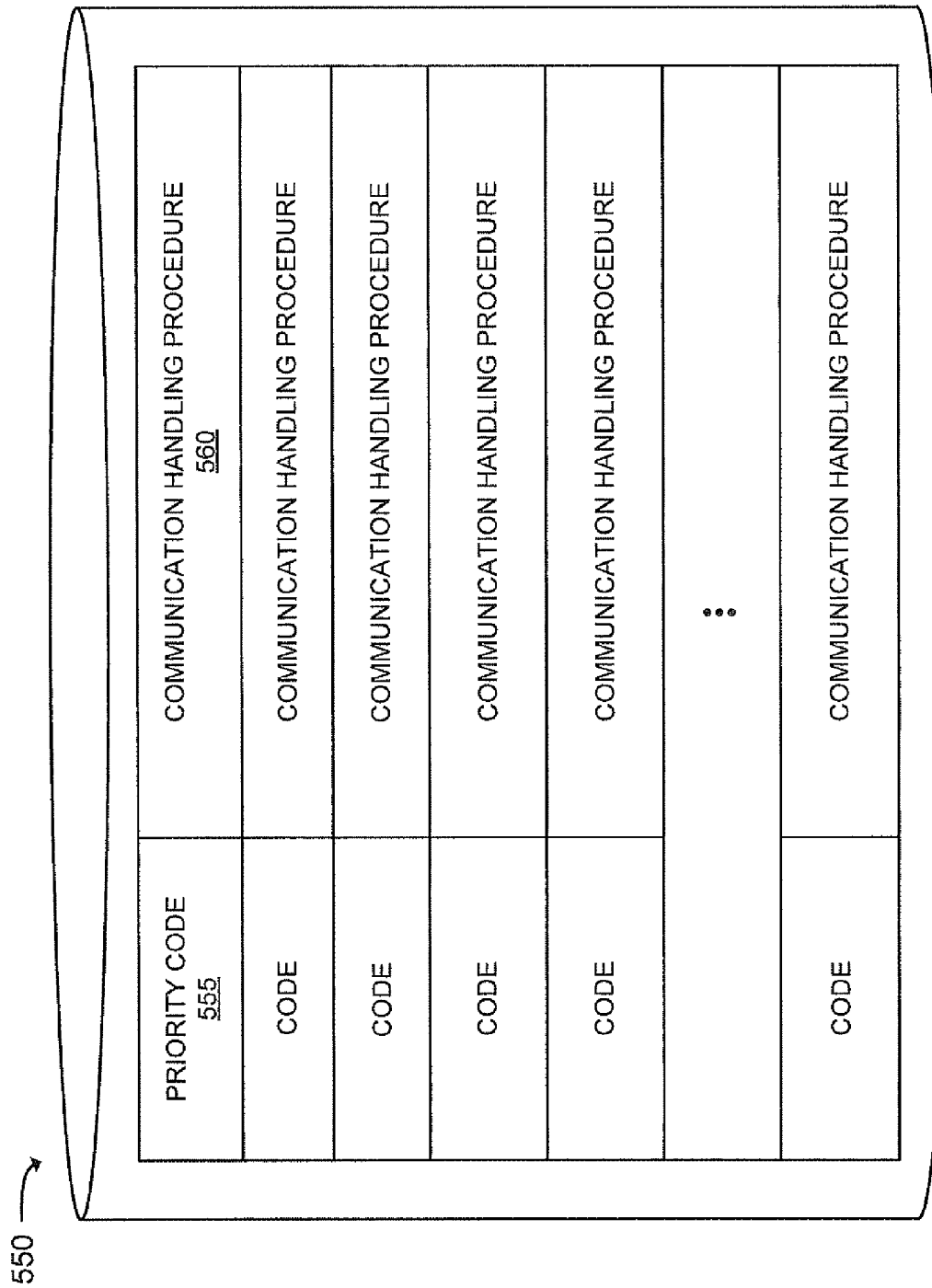

| USER IDENTIFIER 610 | COMMUNICATION HANDLING PROCEDURE 620 |
|---|---|
| 555-555-1234, 555-555-1235, 555-444-1212, | PROVIDE IMAGE FILE AAA, AUDIO FILE AAA AS RINGBACK, FORWARD CALL TO MY CELL PHONE |
| 555-555-9876 | PROVIDE AUDIO FILE AAA, VIDEO FILE AAA, CAPTURE AND PROVIDE CURRENT WEATHER REPORT FOR HAWAII, ROUTE TO VIDEOMAIL |
| 412-412-12** | PROVIDE IMAGE FILE BBB, AUDIO FILE BBB, DATA FILE AAA |
| MOM@SIP.COM | PROVIDE VIDEO FILE BBB, AUDIO FILE AAA, AUDIO FILE CCC, ROUTE TO VIDEOMAIL |
| DEFAULT | PROVIDE AUDIO FILE DDD, ROUTE TO VOICEMAIL |

FIG. 6

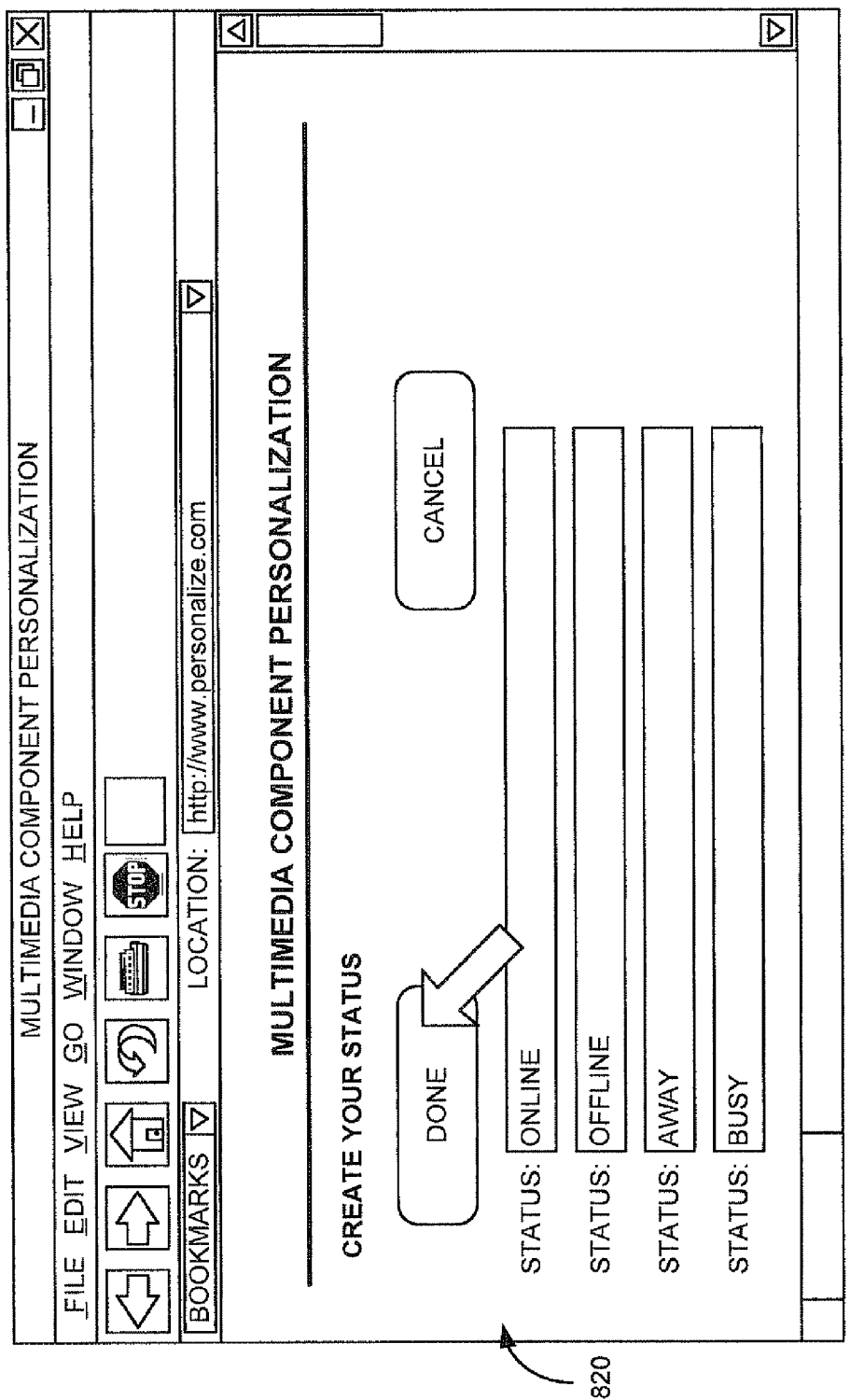

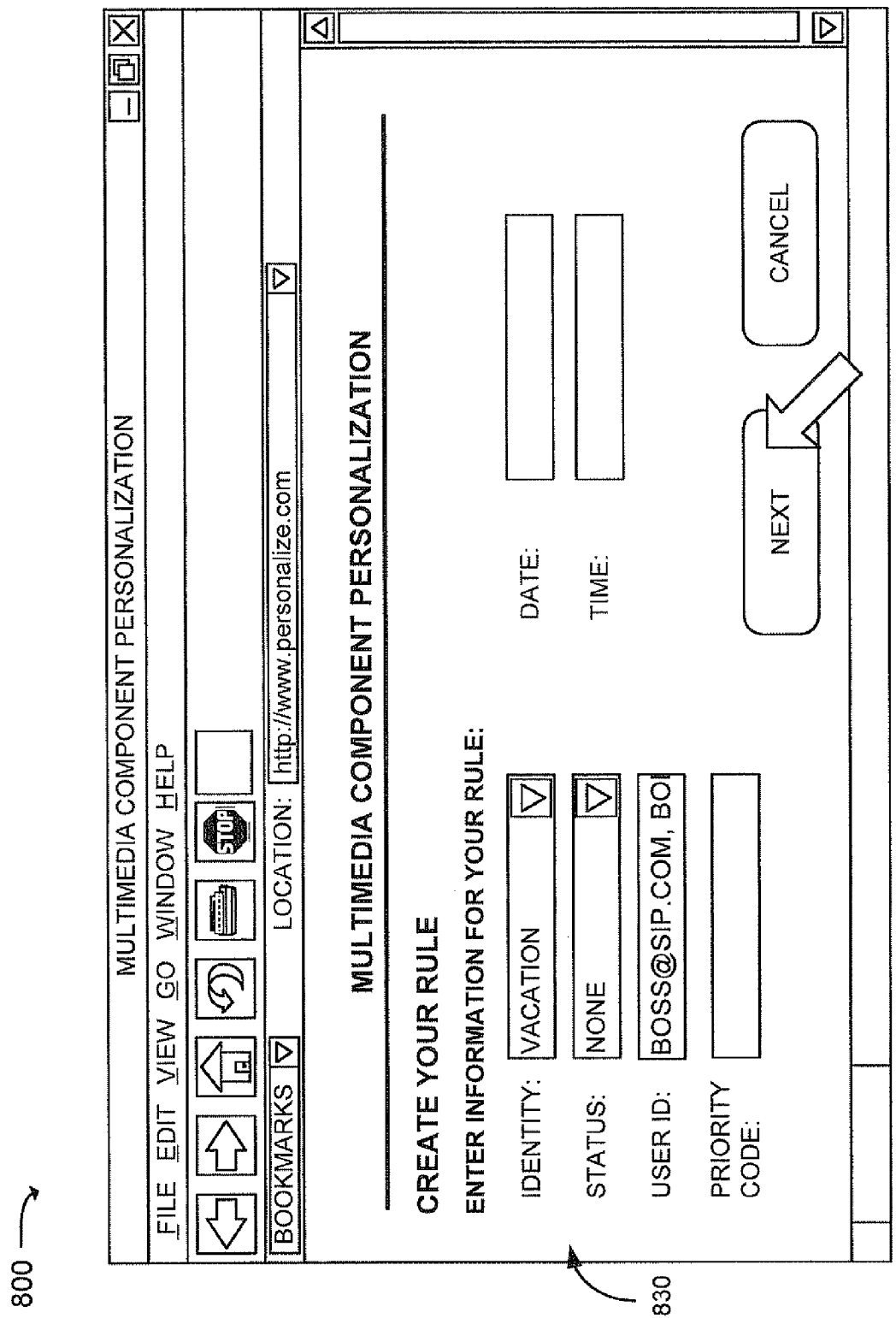

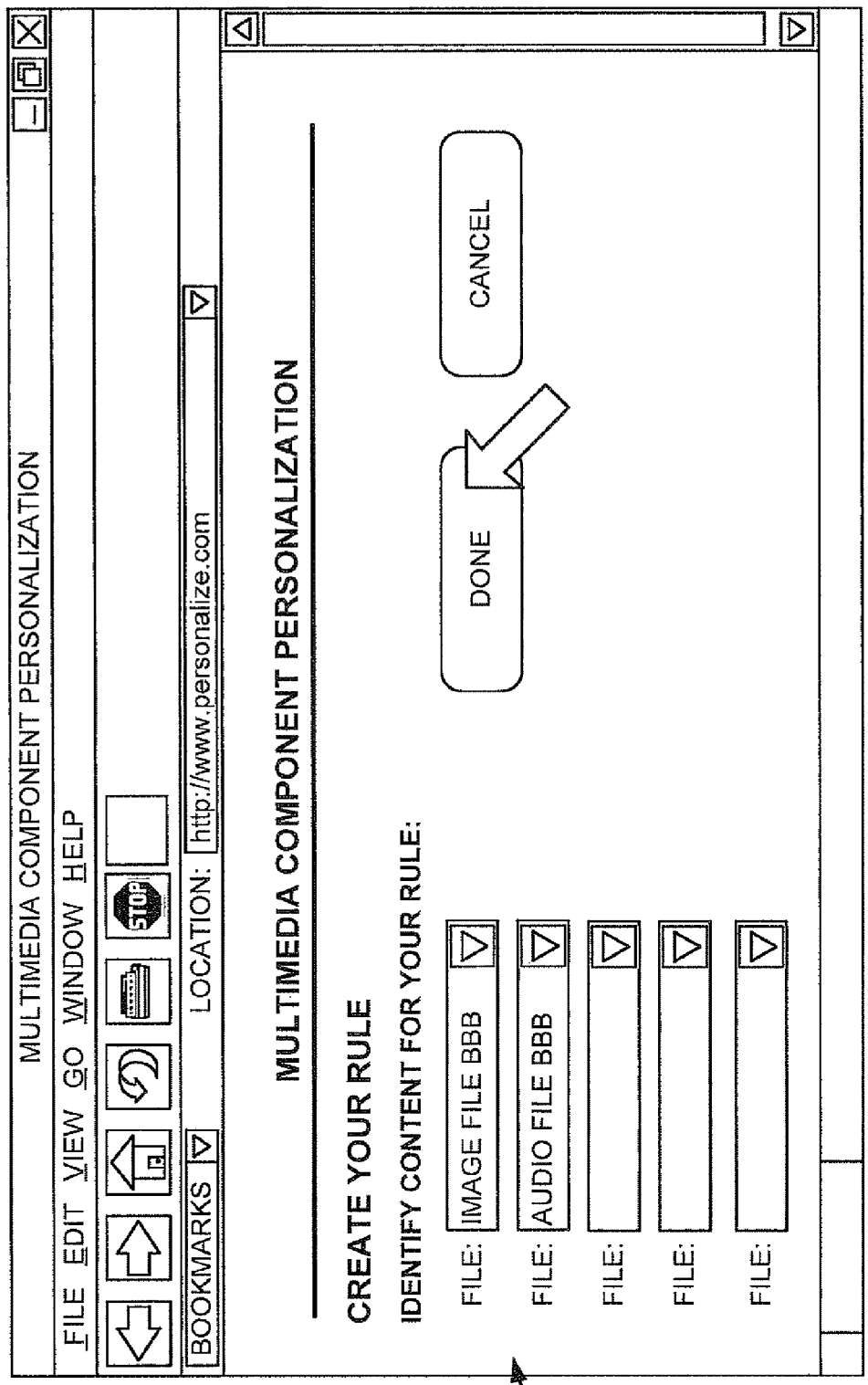

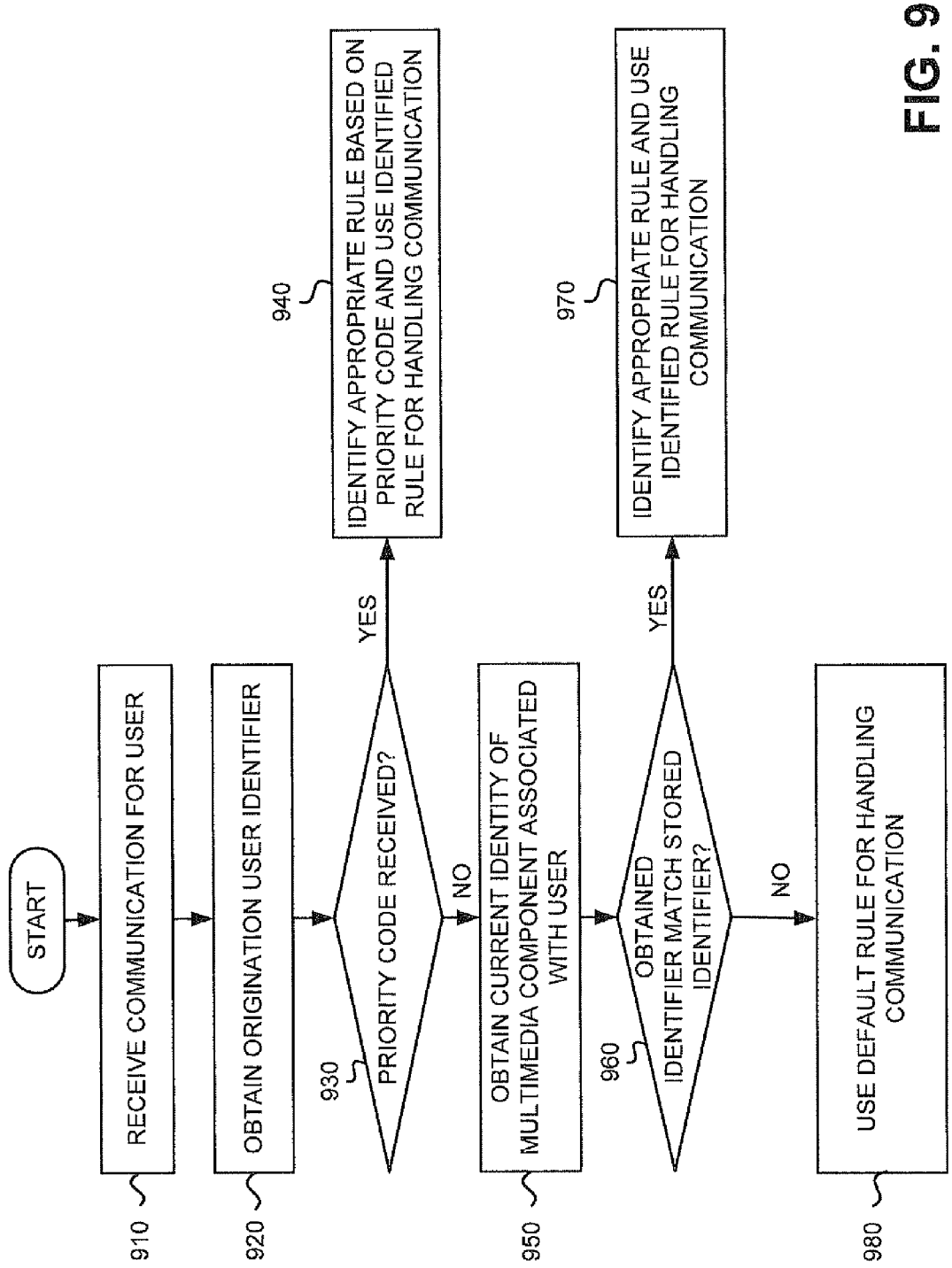

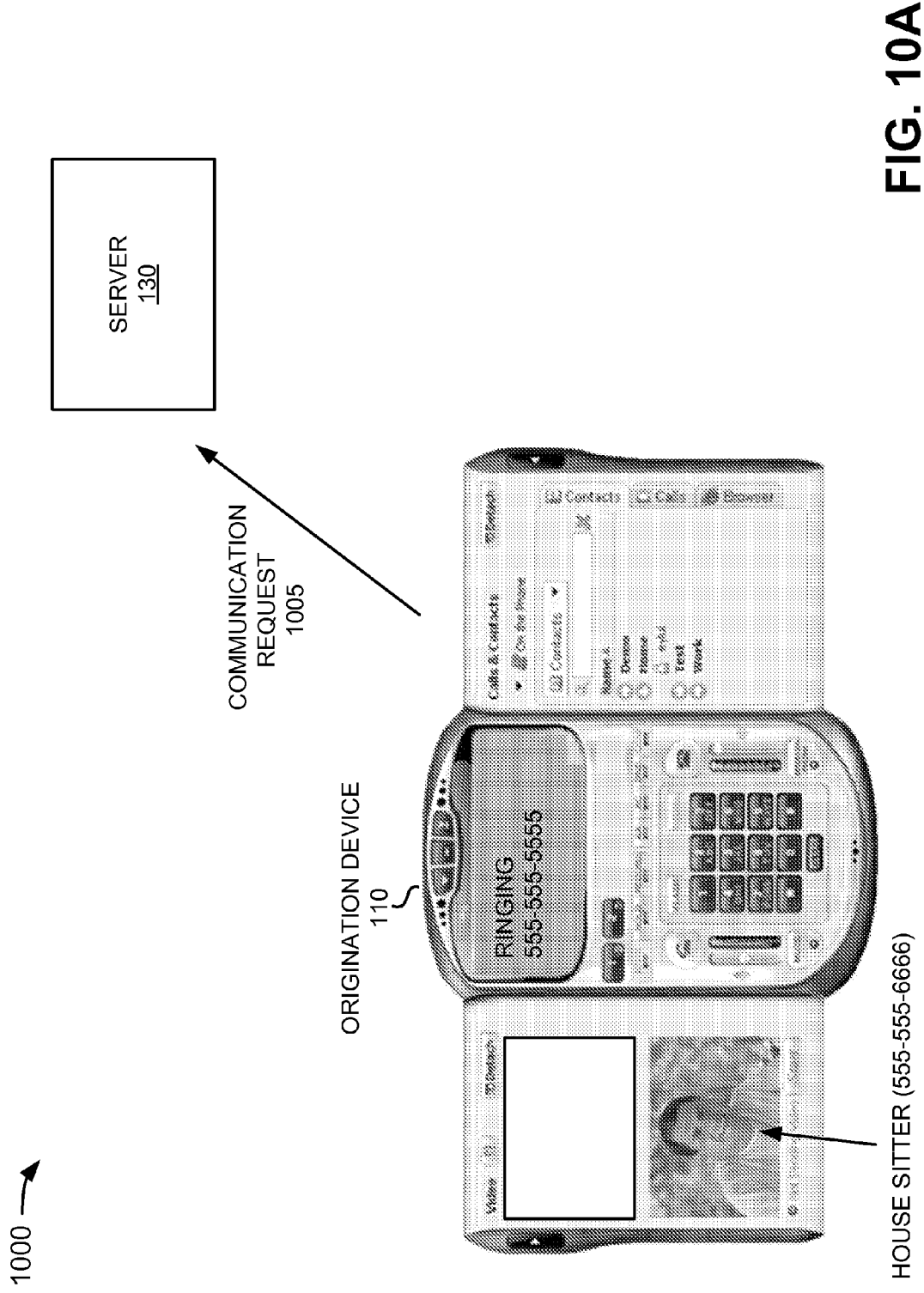

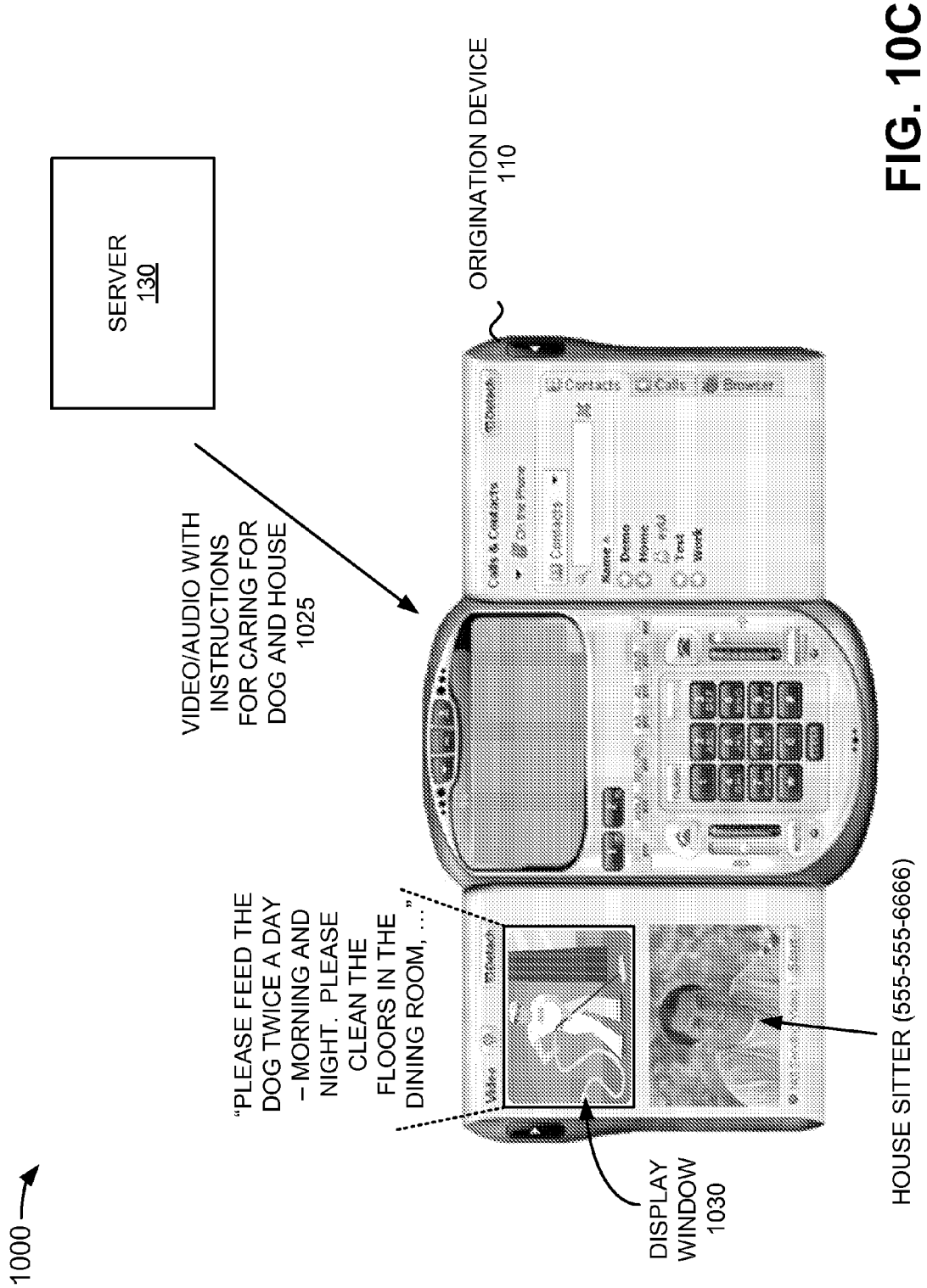

MULTIMEDIA PERSONAL ASSISTANT

BACKGROUND INFORMATION

A business may employ administrative assistants for answering and screening telephone calls and multimedia sessions. When a telephone call or multimedia session arrives for an employee of the business, an administrative assistant may answer the telephone call or multimedia session and request information from the calling party (such as the calling party's name) that will enable the employee to know whether or not to take the telephone call/session. The call/session may ultimately be connected to the requested party, routed to voicemail/videomail, played an informative and personalized voice or multimedia message or given other treatment.

BRIEF DESCRIPTION OF THE DRAWINGS

FIG. 4 is an exemplary functional diagram of a portion of the server of FIG. 1;

FIGS. 5A-5D are exemplary diagrams of portions of databases that may be associated with the server of FIG. 1;

FIG. 6 is an exemplary diagram of rules consistent with exemplary embodiments;

FIGS. 8A-8E illustrate an example of the exemplary process of FIG. 7;

FIG. 9 is a flow chart of an exemplary process for processing a communication consistent with exemplary embodiments.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Embodiments described herein are directed to a multimedia personal assistant that is analogous to the perfect administrative assistant that knows about a user's life, including the user's work, home, vacation, leisure, activities, schedules, etc. The multimedia personal assistant may process, on the user's behalf, requests made to the user to the user's exact specifications. In one embodiment, the multimedia personal assistant may manage and deliver personalized multimedia content to requestors based on the user's preferences, location, and/or presence status. For example, prior to going on vacation, a user may configure multimedia personal assistant preferences for processing sessions (e.g., voice or video calls) and/or received messages (e.g., instant messages, Short Message Service (SMS) messages, electronic mail (e-mail) messages, etc.) while the user is away.

The following provides examples of personalized responses that may be received by different requesters (a work colleague, a house sitter, and a boss) that initiate a video call to the user while the user's multimedia personal assistant has been set to a "Vacation" status.

1. Work Colleague—A work colleague may be identified as such based, for example, on the work colleague's calling identity (e.g., an automatic number identifier (ANI), a uniform resource identifier (URI), etc.). Assume that the user is currently working on the XYZ project. Thus, the user may cause the work colleague to receive a video where the user provides the XYZ project status and points of contact for further project details.

2. House Sitter—A house sitter may be identified as such based, for example, on the house sitter's calling identity (e.g., ANI, URI, etc.). The user may cause the house sitter to receive a video showing the location of the key to the mailbox, how to set the alarm system, where the pet food is located, along with instructions for pet care while the user is away.

3. Boss—A boss may be identified as such based, for example, on the boss's calling identity (e.g., ANI, URI, etc.). The user may cause the boss to receive a video detailing the user's vacation plans and how and when the user can best be reached. The user may also cause the boss to be presented with a vacation override that allows the boss to initiate a session with the user even though the user is on vacation.

A "multimedia personal assistant," as broadly described herein may include one or more components located on a user's device and/or one or more components located on one or more network devices, such as a server. Thus, a "multimedia personal assistant" may include components located on a single device or on multiple (possibly remote) devices.

Figure 1:
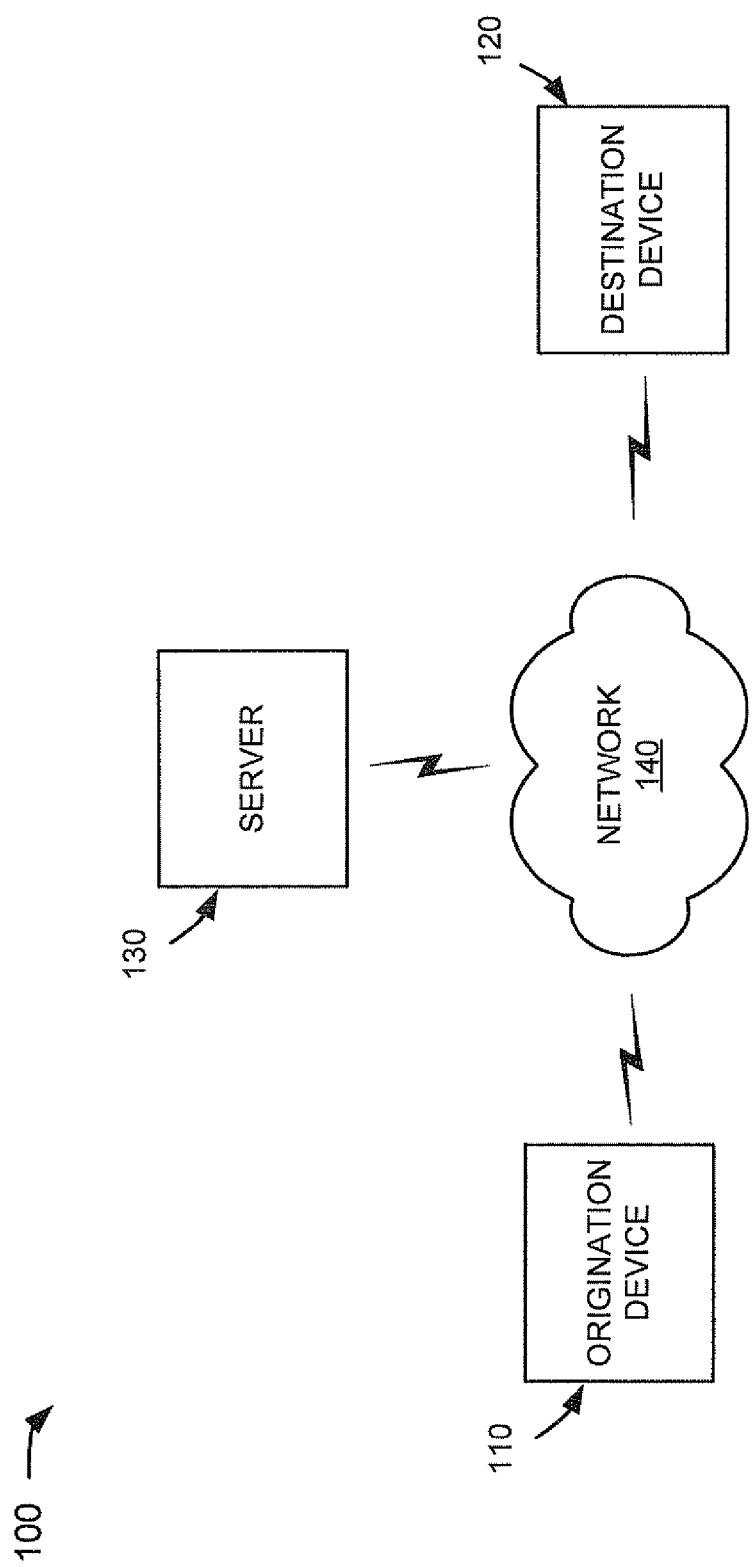
FIG. 1 is an exemplary network in which systems and methods, consistent with exemplary embodiments, may be implemented.

FIG. 1 is an exemplary network 100 in which systems and methods, consistent with exemplary embodiments, may be implemented. As illustrated, network 100 may include an origination device 110, a destination device 120, a server 130, and a network 140. The number of origination devices 110, destination devices 120, servers 130, and networks 140 illustrated in FIG. 1 is provided for simplicity. In practice, there may be more origination devices 110, destination devices 120, servers 130, and/or networks 140.

Origination device 110 may include a client entity. An entity may be defined as a device, such as a computer or another type of computation or communication device, a thread or process running on one of these devices, and/or an object executable by one of these devices. In one embodiment, origination device 110 may include a personal computer, a laptop, a wireless device (e.g., a cellular telephone, a personal digital assistant (PDA), etc.), and/or any other type of device that may originate a voice session, a video session, an instant messaging session, an SMS message, an e-mail message, and/or other types of sessions or messages. In addition, origination device 110 may include other types of telephone and/or video conferencing devices. For example, origination device 110 may also include a POTS telephone, a Session Initiation Protocol (SIP) telephone, an Internet Protocol (IP) Multimedia Subsystem (IMS) client, a set top box that provides voice and/or video sessions, and/or other types of telephone/video conferencing devices. Origination device 110 may connect to network 140 via wired and/or wireless connections.

Destination device 120 may include a client entity. In one embodiment, destination device 120 may include a personal computer, a laptop, a wireless device (e.g., a cellular telephone, a personal digital assistant (PDA), etc.), and/or any other type of device to which voice, video, and/or other types of session may be established. Moreover, destination device 120 may include a device capable of receiving instant messages, SMS messages, e-mail messages, and/or other types of messages. In addition, destination device 120 may include other types of telephone and/or video conferencing devices. For example, destination device 120 may also include a POTS telephone, a SIP telephone, an IMS client, a set top box that provides voice and/or video sessions, and/or other types of telephone/video conferencing devices. Destination device 120 may connect to network 140 via wired and/or wireless connections.

Server 130 may include a server entity. As indicated above, an entity may be defined as a device, such as a computer or another type of computation or communication device, a thread or process running on one of these devices, and/or an object executable by one of these devices. In one embodiment, server 130 may process voice session requests, video session requests, instant messages, SMS messages, e-mails, and/or other types of requests or messages destined for destination device 120 that have originated with origination device 110. In some embodiments, server 130 may respond to the requests and messages on behalf of destination device 120. In one embodiment, server 130 may transmit multimedia content to origination device 110 based on personalization information from a user associated with destination device 120. Server 130 may connect to network 140 via wired and/or wireless connections.

Network 140 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an IMS network, a private network, the Internet, an intranet, and/or another type of network.

One or more components of network 100 may perform one or more of the tasks described as being performed by one or more other components of network 100.

Figure 2:
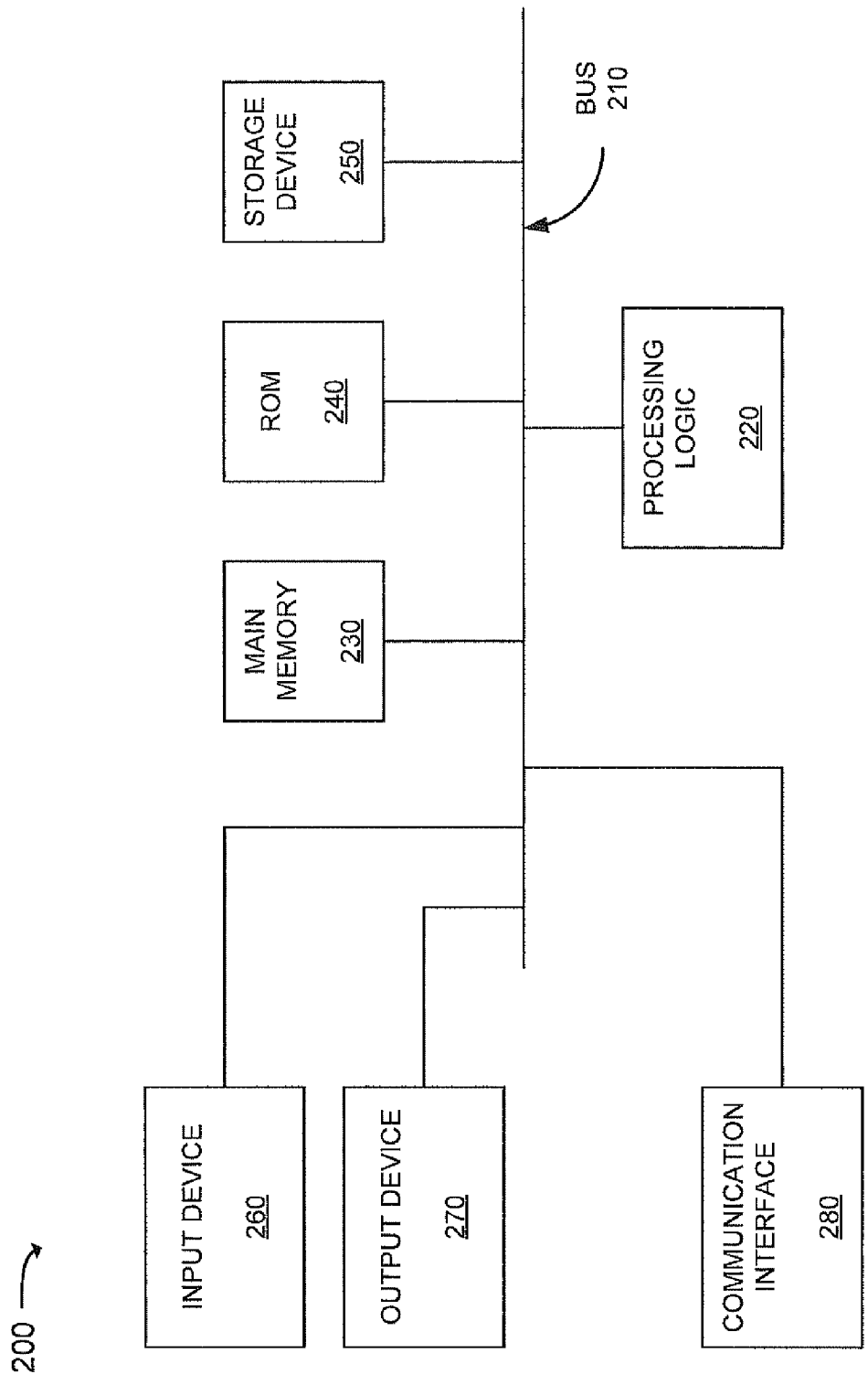
FIG. 2 is an exemplary block diagram of a device consistent with exemplary embodiments.

FIG. 2 is an exemplary block diagram of a device 200 in one embodiment. Device 200 may correspond to origination device 110, destination device 120, and/or server 130. As illustrated, device 200 may include a bus 210, processing logic 220, a main memory 230, a read only memory (ROM) 240, a storage device 250, an input device 260, an output device 270, and/or a communication interface 280. In one embodiment, device 200 may include fewer, additional, or different components than those illustrated in FIG. 2.

Bus 210 may include a path that permits communication among the components of device 200. Processing logic 220 may include a processor, a microprocessor, or other types of processing logic, such as an application specific integrated circuit (ASIC), a field programmable gate array (FPGA), etc., that may interpret and execute instructions. Main memory 230 may include a random access memory (RAM) or another type of dynamic storage device that may store information and instructions for execution by processing logic 220. ROM 240 may include a ROM device or another type of static storage device that may store static information and instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, a camera, an audio/video recorder, etc. Output device 270 may include a mechanism that outputs information to the operator, including a display, a printer, a speaker, etc. Communication interface 280 may include any transceiver-like mechanism that enables device 200 to communicate with other devices and/or systems via a network, such as network 140.

As will be described in detail below, device 200 may perform certain operations. Device 200 may perform these and other operations in response to processing logic 220 executing software instructions contained in a computer-readable medium, such as main memory 230. A computer-readable medium may be defined as a physical and/or logical memory device or a carrier wave.

The software instructions may be read into main memory 230 from another computer-readable medium, such as storage device 250, or from another device via communication interface 280. The software instructions contained in main memory 230 may cause processing logic 220 to perform processes that will be described later. Alternatively, hard-wired circuitry may be used in place of, or in combination with, software instructions to implement processes consistent with exemplary embodiments. Thus, embodiments described herein are not limited to any specific combination of hardware circuitry and software.

Figure 3:
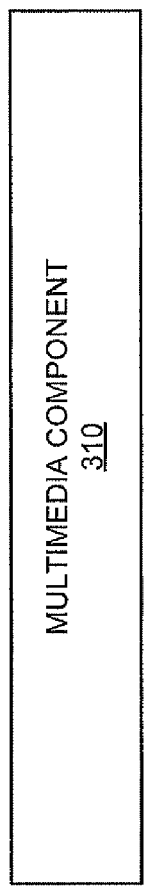
FIG. 3 is an exemplary functional diagram of a portion of the destination device of FIG. 1.

FIG. 3 is an exemplary functional diagram of a portion of destination device 120 according to an exemplary embodiment. As illustrated, destination device 120 may include a multimedia component 310. In other embodiments, destination device 120 may include additional or different components than illustrated in FIG. 3. In one embodiment, multimedia component 310 may be associated with multiple destination devices 120 (e.g., a user's work computer, the user's home computer, the user's cell phone, etc.).

Multimedia component 310 may include one or more components via which a user may participate in a voice session, a video session, an instant messaging session, and/or other types of sessions. Moreover, multimedia component 310 may include one or more components via which the user may send and/or receive SMS messages, e-mail messages, and/or other types of messages. In one embodiment, multimedia component 310 may include address book and/or calendar functions. Alternatively or additionally, multimedia component 310 may interact with an address book and/or calendar associated with the user.

FIG. 4 is an exemplary functional diagram of a portion of server 130 according to an exemplary embodiment. As illustrated, server 130 may include a multimedia creation component 410, a personalization component 420, and a communication handling component 430. In other embodiments, server 130 may include fewer, additional, or different components than illustrated in FIG. 4. Moreover, one or more of the components illustrated in FIG. 4 may additionally and/or alternatively be implemented within another device, such as destination device 120.

Multimedia creation component 410 may include one or more components that allow a user to create and store multimedia response messages to be provided for incoming communications. In one embodiment, multimedia creation component 410 may allow a user to combine different types of content (e.g., audio files, image files, video files, data files, and/or other types of files) to create a multimedia response message. In addition, multimedia creation component 410 may allow a user to capture live content for providing as part of multimedia response messages. For example, a user may cause a current weather report, sports scores, stock tickers, etc. to be captured by multimedia creation component 410 from a network device and possibly combined with audio, image, video, data, and/or other types of files. In some embodiments, a user may upload content to multimedia creation component 410.

Personalization component 420 may include one or more components that allow a user to create rules that identify particular stored content to be provided to particular users and define when that stored content is to be provided to those particular users. Moreover, the rules may specify how a particular communication session is to be handled (e.g., whether a communication establishment request should be routed to voicemail, videomail, forwarded to a particular destination device 120, etc.). As one example, the rules may specify that if user A calls during a particular time period (or date range), provide this particular multimedia response message to user A prior to routing the call to voicemail, provide the particular multimedia response message as a ringback tone while establishing the call to the user's multimedia component 310, etc.

In one embodiment, the user may create one or more identities in which the user's multimedia component 310 may operate. For example, the user may create a "work" identity for when the user is at work, a "home" identity for when the user is at home, a "vacation" identity for when the user is on vacation, a "business travel" identity for when the user is on a business trip, a "student" identity for when the user is at school, and/or other types of identities. The user may create one or more rules for each different identity.

In one embodiment, the user may also (or alternatively) specify (or create) different operational modes (also called "statuses") in which the user's multimedia component 310 may be set. For example, the user may specify an "online" mode (e.g., meaning that the user is currently available at multimedia component 310), an "offline" mode (e.g., meaning that the user is not available at multimedia component 310 (e.g., the user has not logged into multimedia component 310, has not activated multimedia component 310, etc.)), an "away" mode (e.g., meaning that the user is away from multimedia component 310 for an extended period of time), a "be right back" mode (e.g., meaning that the user is away from multimedia component 310 for a shorter period of time), a "busy" mode (e.g., meaning that the user is at multimedia component 310, but may be unavailable to communicate), a "do not disturb" mode (e.g., meaning that the user is at multimedia component 310, but is unavailable to communicate), and/or other types of modes. The user may create one or more rules for each different operational mode. In some embodiments, a user may associate one or more operational modes with each created identity.

In one embodiment, the user may define one or more priority codes and associate (or create) rules for each priority code. The priority codes may, for example, be provided to one or more origination users for urgent or emergency situations. For example, the user may define a priority code that, when received from the user's boss, causes project information to be provided to the boss (e.g., in audio/video form) for a project on which the user is working, along with a list of points of contact for the project.

Communication handling component 430 may receive a communication from an origination device 110, obtain multimedia content using one or more created rules, and provide the multimedia content as a response message to origination device 110. The selection of the appropriate multimedia content for the response message may be based on, for example, an identifier associated with an origination user (also referred to as an "initiator" hereinafter) associated with origination device 110 (e.g., a name, an address associated with origination device 110, such as a telephone number, a URI, an IP address, etc.), an identity in which the destination user's multimedia component 310 is operating, an operational mode to which the destination user's multimedia component 310 has been set, the current date and/or time, location information of the destination user, and/or other types of information. Communication handling component 430 may also modify multimedia content based on the capabilities of origination device 110. For example, communication handling component 430 may provide some content from identified multimedia content to be provided and not provide other content based on the capabilities of origination device 110. As one example, if origination device 110 is only capable of receiving audible communications and communication handling component 430 has identified a video/voice message to be provided to origination device 110, communication handling component 430 may only provide the voice part of the message to origination device 110. Communication handling component 430 may also convert particular content from a first format to a second format (e.g., a data file to an audio file) based on the capabilities of origination device 110.

One or more components of the above portion of server 130 may perform one or more of the tasks described as being performed by one or more other components of the above portion of server 130.

Figure 5A:
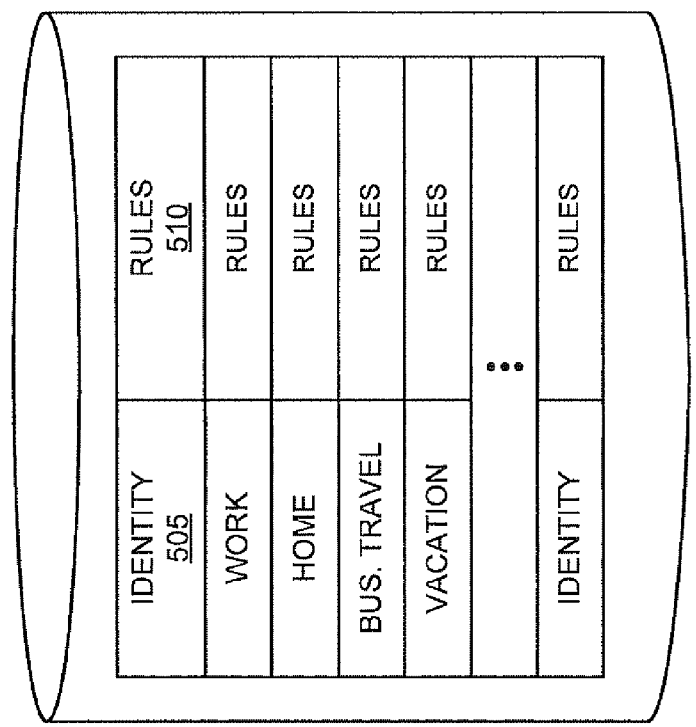

FIG. 5A is an exemplary diagram of a portion of a first database 500 that may be associated with server 130. In addition or alternatively, database 500 may be associated with another device, such as destination device 120. While one database is described below, it will be appreciated that database 500 may each include multiple databases stored locally at server 130 (and/or destination device 120), or stored at one or more different and possibly remote locations.

As illustrated, database 500 may maintain a group of entries in the following exemplary fields: an identity field 505 and a rules field 510. Database 500 may maintain additional or different information than that illustrated in FIG. 5A.

Identity field 505 may store information identifying each identity in which the user's multimedia component 310 may operate. For example, as illustrated in FIG. 5A, the user may create a "work" identity for when the user is at work, a "home" identity for when the user is at home, a "business travel" identity for when the user is on a business trip, a "vacation" identity for when the user is on vacation, and/or other types of identities. The user may identify each identity via a unique sequence of characters.

Rules field 510 may store one or more rules for each identity specified in identity field 505. Each rule may identify particular content (e.g., multimedia content) and specify various factors for determining when to provide the identified particular content for the identity identified in identity field 505. The factors may include, for example, date and/or time information, information identifying the initiator of a communication (e.g., an initiator of a voice session request, a video session request, an instant message, an SMS message, an e-mail message, etc.), the user's Presence and Location information, etc. Each rule may include a link (or links) to the multimedia content associated with the rule. One or more of the rules in rules field 510 may specify how a particular communication is to be treated (e.g., by routing the communication to voicemail, to videomail, to a destination device 120 associated with the user, etc.).

FIG. 5B is an exemplary diagram of a portion of a second database 515 that may be associated with server 130. In addition or alternatively, database 515 may be associated with another device, such as destination device 120. While one database is described below, it will be appreciated that database 515 may each include multiple databases stored locally at server 130 (and/or destination device 120), or stored at one or more different and possibly remote locations.

As illustrated, database 515 may maintain a group of entries in the following exemplary fields: a status field 520 and a rules field 525. Database 515 may maintain additional or different information than that illustrated in FIG. 5B.

Status field 520 may store information identifying different operational modes in which the user's multimedia component 310 may be set. For example, the user may specify (or create) an "online" mode (e.g., meaning that the user is currently available at multimedia component 310), an "offline" mode (e.g., meaning that the user not available at multimedia component 310), an "away" mode (e.g., meaning that the user is away from multimedia component 310 for an extended period of time), a "be right back" mode (e.g., meaning that the user is away from multimedia component 310 for a shorter period of time), a "busy" mode (e.g., meaning that the user is at multimedia component 310, but may be unavailable to communicate), a "do not disturb" mode (e.g., meaning that the user is at multimedia component 310, but is unavailable to communicate), and/or other types of modes.

Rules field 525 may store one or more rules for each operational mode specified in status field 520. Each rule may identify particular content (e.g., multimedia content) and specify various factors for determining when to provide the identified particular content for the operational mode identified in status field 520. The factors may include, for example, date and/or time information, information identifying the initiator of a communication (e.g., an initiator of a voice session request, a video session request, an instant message, an SMS message, an e-mail message, etc.), the user's Presence and Location information, etc. Each rule may include a link (or links) to the multimedia content associated with that rule. One or more of the rules in rules field 525 may specify how a particular communication is to be treated (e.g., by routing the communication to voicemail, to videomail, to a destination device 120 associated with the user, etc.).

Figure 5C:
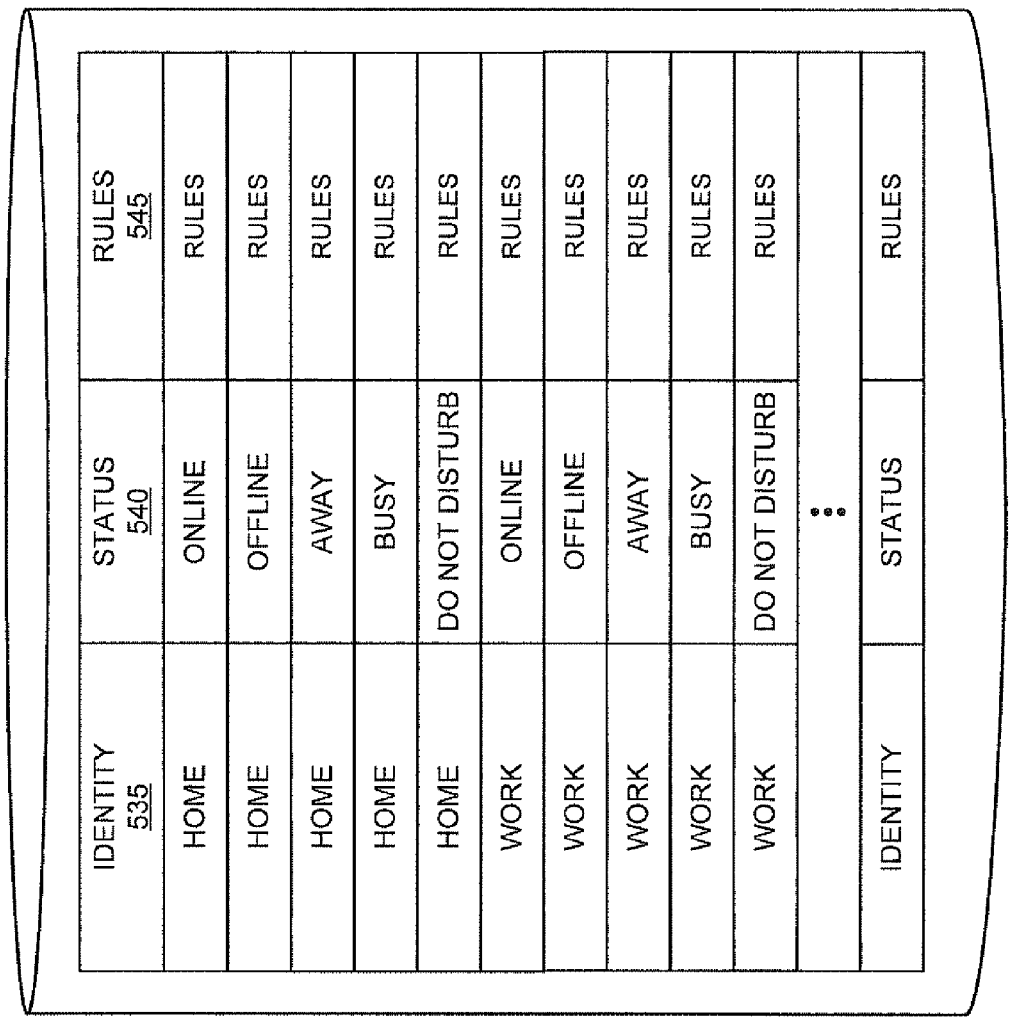

FIG. 5C is an exemplary diagram of a portion of a third database 530 that may be associated with server 130. In addition or alternatively, database 530 may be associated with another device, such as destination device 120. While one database is described below, it will be appreciated that database 530 may each include multiple databases stored locally at server 130 (and/or destination device 120), or stored at one or more different and possibly remote locations.

As illustrated, database 530 may maintain a group of entries in the following exemplary fields: an identity field 535, a status field 540, and a rules field 545. Database 530 may maintain additional or different information than that illustrated in FIG. 5C.

Identity field 535 may store information identifying each identity in which the user's multimedia component 310 may operate. This field may be similar to identity field 505 discussed above with respect to FIG. 5A.

Status field 540 may store information identifying different operational modes in which the user's multimedia component 310 may be set for each identity identified in identity field 535. For example, the user may specify (or create) an "online" mode, an "offline" mode, an "away" mode, a "busy" mode, and a "do not disturb" mode and associate those modes with the user's "home" and "work" identities.

Rules field 545 may store one or more rules for each identity/status pair identified in fields 535 and 540. Each rule may identify particular content (e.g., multimedia content) and specify various factors for determining when to provide the identified particular content for the identity/status pair. The factors may include, for example, date and/or time information, information identifying the initiator of a communication (e.g., an initiator of a voice session request, a video session request, an instant message, an SMS message, an e-mail message, etc.), the user's Presence and Location information, etc. Each rule may include a link (or links) to the multimedia content associated with that rule. One or more of the rules in rules field 545 may specify how a particular communication is to be treated (e.g., by routing the communication to voicemail, to videomail, to a destination device 120 associated with the user, etc.).

FIG. 5D is an exemplary diagram of a portion of a fourth database 550 that may be associated with server 130. In addition or alternatively, database 550 may be associated with another device, such as destination device 120. While one database is described below, it will be appreciated that database 550 may each include multiple databases stored locally at server 130 (and/or destination device 120), or stored at one or more different and possibly remote locations.

As illustrated, database 550 may maintain a group of entries in the following exemplary fields: a priority code field 555 and a communication handling procedure field 560. Database 550 may maintain additional or different information than that illustrated in FIG. 5D.

Priority code field 555 may store a unique sequence of characters that may be provided by an origination device 110. A user of an origination device 110 may provide the unique sequence of characters in, for example, high priority or emergency situations.

Communication handling procedure field 560 may store a communication handling procedure for each priority code identified in priority code field 555. Each communication handling procedure may identify particular content (e.g., multimedia content) and specify various factors for determining when to provide the identified particular content for the identity/status pair. One or more of the communication handling procedures in communication handling procedure field 560 may specify how a particular communication is to be treated (e.g., by routing to a destination device 120 associated with the user).

FIG. 6 is a diagram of exemplary rules 600 that may be associated with an identity of multimedia component 310. In this example, assume that a user is going on vacation to Hawaii and created rules 600 for a vacation identity of multimedia component 310. As illustrated, rules 600 may specify the following exemplary fields: a user identifier field 610 and a communication handling procedure field 620. Rule 600 may specify additional or different information than that illustrated in FIG. 6.

User identifier field 610 may store information identifying origination users. For example, user identifier field 610 may store names, addresses (e.g., telephone numbers, URIs, instant messaging addresses, e-mail addresses, etc.), etc. for origination users that may contact the user during the user's vacation. Assume for this example, that the first entry corresponds to telephone numbers for members of the user's family (e.g., the user's children), the second entry corresponds to the user's brother, the third entry corresponds to the user's co-workers (the asterisks representing wildcard characters), the fourth entry corresponds to the user's mother, and the fifth entry corresponds to all other user identifiers not specified in first through fourth entries.

Communication handling procedure field 620 may include information identifying how communications from the users identified in user identifier field 610 are to be processed. For example, if a communication session request is received from a family member of the user (e.g., from an origination device 110), communication handling procedure field 620 may specify that image file "AAA" (which may be a picture of Hawaii) and audio file "AAA" (which may include Hawaiian music) are to be provided to family member's origination device 110 as a ringback tone, and the communication session is to be established to the user's cell phone.

If a communication session request is received from the brother (e.g., from an origination device 110), communication handling procedure field 620 may specify that audio file "AAA" (which, as indicated above, may include Hawaiian music) and video file "AAA" (which may include a video of a person surfing) are to be provided to brother's origination device 110, along with a current weather report for Hawaii (which may be captured from a specified network device). The communication session request may then be routed to the user's videomail service.

If a communication session request is received from a co-worker (e.g., from an origination device 110), communication handling procedure field 620 may specify that image file "BBB" (which may be a picture of the user working at his desk), audio file "BBB" (which may include a voice message for the co-worker regarding the user's location and the status of a project on which the user is working), and data file "AAA" (which may include points of contact for the project) are to be provided to co-worker's origination device 110.

If a communication session request is received from the mother (e.g., from an origination device 110), communication handling procedure field 620 may specify that video file "BBB" (which may include a video of two people walking on the beach in Hawaii), audio file "AAA" (which, as indicated above, may include Hawaiian music), and audio file "CCC" (which may include a voice message to the mother regarding the user's vacation) are to be provided to mother's origination device 110. The communication session request may then be routed to the user's videomail service.

If any other communication session requests are received from origination users not identified above, communication handling procedure field 620 may specify that audio file "DDD" (which may include a voice message indicating that the user is out on vacation) is to be provided. The communication session requests may then be routed to the user's voicemail service.

Figure 7:
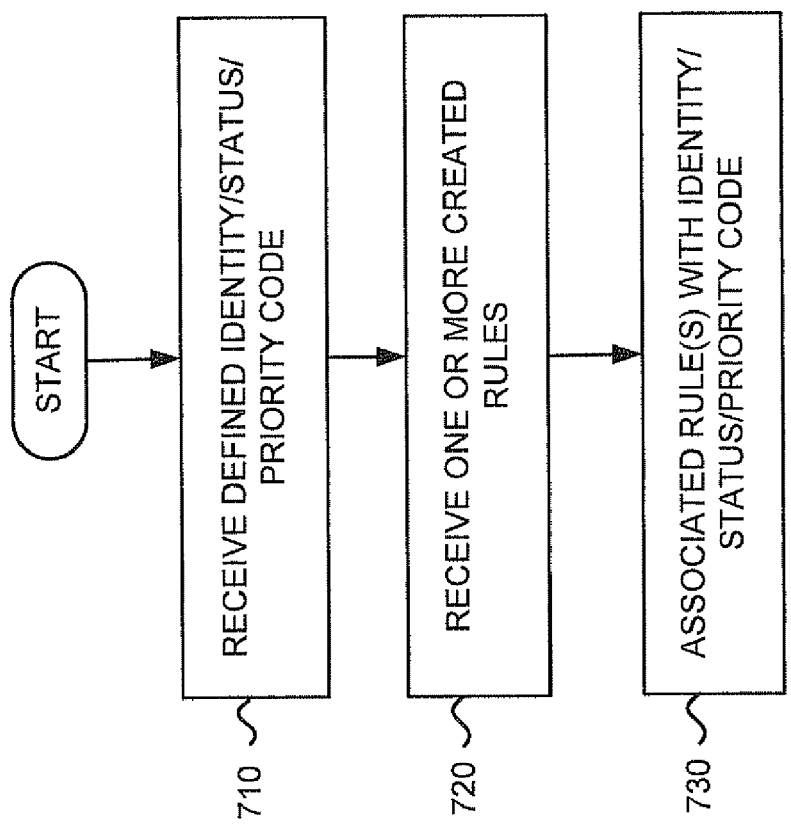
FIG. 7 is a flow chart of an exemplary process for associating rules with an identity, a status, and/or a priority code consistent with exemplary embodiments.

FIG. 7 is a flow chart of an exemplary process for associating rules with an identity, a status, and/or a priority code consistent with exemplary embodiments. In one embodiment, the exemplary process of FIG. 7 may be performed by server 130. In another embodiment, some or all of the exemplary process described below may be performed by another device, such as destination device 120, or combination of devices.

The exemplary process may begin with server 130 receiving a defined identity, status, and/or priority code (block 710). In one embodiment, server 130 (e.g., via personalization component 420) may provide a user with one or more graphical user interfaces that allow the user to define an identity in which the user's multimedia component 310 may operate, a status (e.g., an operational mode) in which the user's multimedia component 310 may be set, and/or define a priority code that may be provided by origination users.

Server 130 may receive one or more created rules for the received identity, status, and/or priority code (block 720). For example, server 130 (e.g., via personalization component 420) may provide one or more graphical user interfaces that allow the user to define rules for each identity, status, and/or priority code.

Server 130 may associate the defined identity, status, and/or priority code with the one or more created rules (block 730). For example, server 130 may store the identity and associated rule(s) in a database, such as database 500 (FIG. 5A); store the status and associated rule(s) in a database, such as database 515 (FIG. 5B); store the identity, status, and rule(s) in a database, such as database 530 (FIG. 5C); and/or store the priority code and the associated rule(s) in a database, such as database 550 (FIG. 5D).

In some embodiments, server 130 may automatically update the identities, statuses, and/or rules. For example, server 130 may subscribe to receive changes made to the destination user's address book and modify the rules to reflect those changes.

Figure 8A:
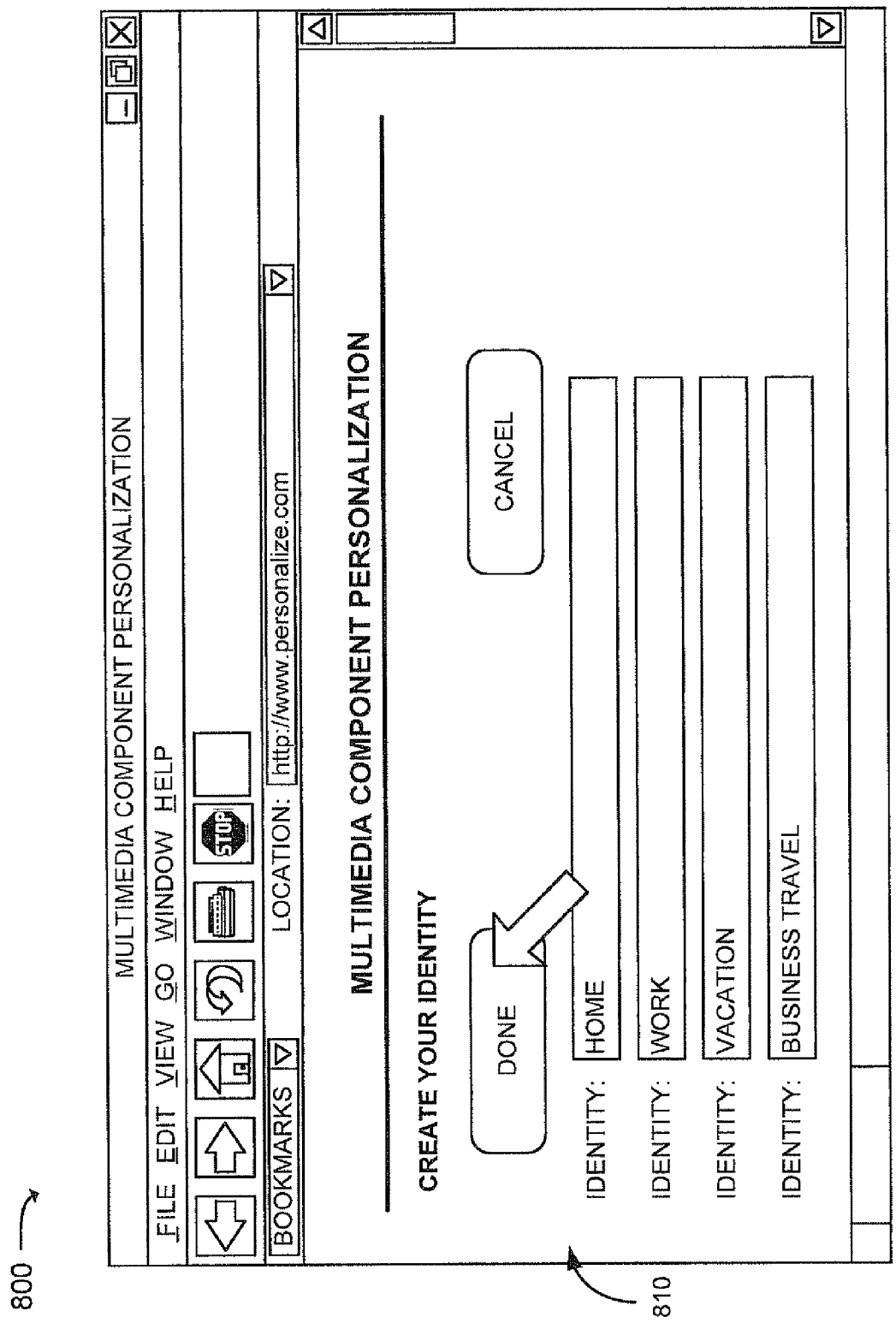

FIGS. 8A-8E provide an example of the exemplary process described with respect to FIG. 7. Assume that a user has accessed server 130 to personalize his/her multimedia component 310. Assume further that server 130 has provided a graphical user interface 810 that allows the user to define identities in which multimedia component 310 will operate, as illustrated in FIG. 8A. Graphical user interface 810 may allow the user to enter names for identities that the user has defined for multimedia component 310. As illustrated in FIG. 8A, assume that the user has entered the identities "home," "work," "vacation," and "business travel" and selected the DONE button.

Server 130 may provide the user with a graphical user interface 820 that allows the user to define statuses (e.g., operation modes) in which multimedia component 310 may be set, as illustrated in FIG. 8B. Graphical user interface 820 may allow the user to enter names for statuses that the user wants to define. As illustrated in FIG. 8B, assume that the user has entered the statuses "online," "offline," "away," and "busy" and selected the DONE button.

Server 130 may provide the user with a graphical user interface 830 that allows the user to create a rule for an identity and/or status or for a priority code, as illustrated in FIG. 8C. Graphical user interface 830 may allow the user to identify a defined identity, status, and/or priority code for which the user wants to create a rule. Moreover, graphical user interface 830 may allow the user to enter additional information for the rule, such as user identifiers (i.e., origination users) for which the rule will apply, a date or date range for which the rule will apply, a time or time range for which the rule will apply, and/or other types of information. As illustrated in FIG. 8C, assume that the user has identified the identity "vacation" and a group of user identifiers for which the rule will apply and selected the NEXT button.

Server 130 may provide the user with a graphical user interface 840 that allows the user to identify content to be provided for the rule, as illustrated in FIG. 8D. Graphical user interface 840 may allow the user to identify the location of content that is to be provided for the rule. The location may be a location on server 130 (e.g., in main memory 230 or storage device 250) or a location on a different network device, such as another server. The content may be static or dynamic. As illustrated in FIG. 8D, assume that the user has identified an image file BBB and an audio file BBB and selected the DONE button.

Figure 8E:
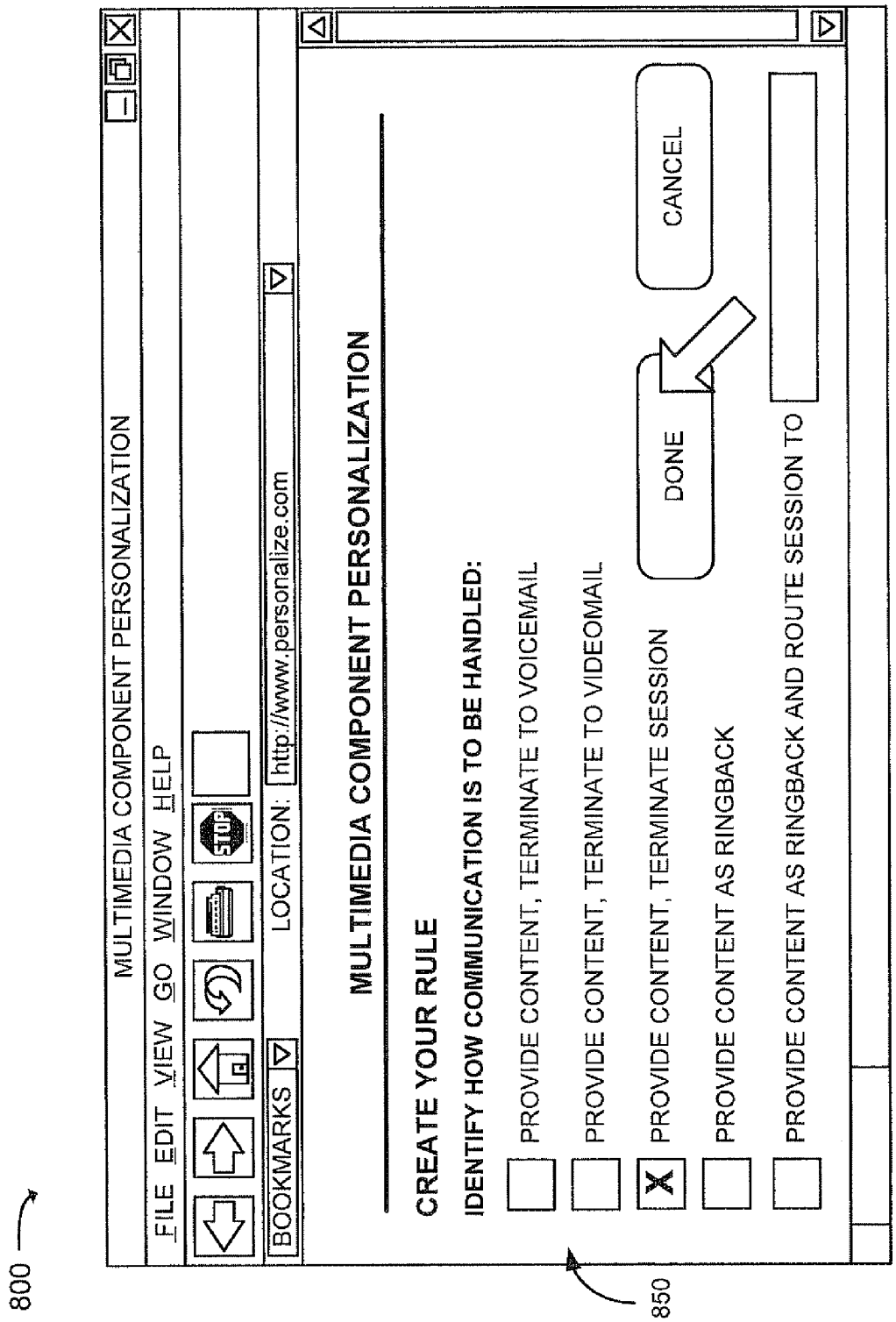

Server 130 may provide the user with a graphical user interface 850 that allows the user to identify how a communication session is to be handled for the rule, as illustrated in FIG. 8E. Graphical user interface 850 may provide the following exemplary options: the identified content is to be provided, and then the communication session is to be sent to voicemail; the identified content is to be provided, and then the communication session is to be sent to videomail; the identified content is to be provided, and then the communication session is to be terminated; the identified content is to be provided as a ringback, while the communication session is sent to multimedia component 310; the identified content is to be provided as a ringback, while the communication session is sent to a particular destination device 120; and/or other handling options (which may or may not involve providing content to the origination user). As illustrated in FIG. 8E, assume that the user has selected the provide content and terminate session option by selecting the box and the DONE button. Server 130 may store the created rule for the identity, status, and/or priority code.

FIG. 9 is a flow chart of an exemplary process for processing a communication consistent with exemplary embodiments. In one embodiment, the exemplary process of FIG. 9 may be performed by server 130. In another embodiment, some or all of the exemplary process described below may be performed by another device, such as destination device 120, or combination of devices.

The exemplary process may begin with server 130 receiving a communication for a destination user (block 910). For example, server 130 may receive a voice or video session establishment request, an instant message, an SMS message, an e-mail, etc. for the destination user. Server 130 may identify the destination user from the request/message by parsing the request/message to identify to whom the request/message is directed. Other techniques for obtaining an identifier for the destination user may alternatively be used. The identifier for the destination user may, for example, take the form of a telephone number, a URI, an instant message address, an e-mail address, and/or other forms of network addresses.

Server 130 may obtain an identifier for the origination user that transmitted the received communication (block 920). For example, server 130 may perform call screening in which server 130 automatically obtains an identifier for the origination user or requests an identifier from the origination user. In one embodiment, server 130 may obtain an identifier for the origination user via an ANI process. Alternatively, server 130 may parse the request/message to obtain the identifier. As another alternative, server 130 may record the origination user speaking his/her name, perform user identification via biometric voice verification, perform user identification via biometric facial recognition, record a video of the origination user, request that the origination user enter his/her name (as input text), enter a pin, enter a telephone number, etc. Other techniques for obtaining an identifier for the origination user may alternatively be used. The identifier may take the form of a telephone number, a URI, an instant message address, an e-mail address, and/or other forms of network addresses. The identifier may also take the form of a name, a pin, voice identity, facial recognition identity, etc.

Server 130 may determine whether a priority code has been received (block 930). The destination user may provide a priority code to one or more origination users to be used, for example, in urgent or emergency situations. Moreover, as indicated above, the destination user may associate particular rules with the priority codes. Server 130 may receive the priority code at any time during the processing of a communication.

If server 130 determines that a priority code has been received (block 930—YES), server 130 may identify the appropriate rule to be used based on the priority code (block 940). For example, in one embodiment, server 130 may use the priority code to look up the appropriate rule from a database, such as database 550. Server 130 may use the rule for handling the received communication (block 940). For example, the rule associated with the received priority code may indicate that the received communication (e.g., voice or video session establishment request, instant message, SMS message, e-mail message, etc.) should be routed to a cell phone (or other destination device) associated with the destination user. In this situation, server 130 may cause, for example, a voice or video session to be established between origination device 110 (associated with the origination user) and identified destination device 120 (associated with the destination user) or the instant message, SMS message, or e-mail message to be forwarded to identified destination device 120.

If, on the other hand, server 130 determines that a priority code has not been received (block 930—NO), server 130 may obtain a current identity in which multimedia component 310 is operating (block 950). For example, the destination user may set the identity in which multimedia component 310 is currently operating in any known manner (e.g., via a menu, toolbar button, voice command, etc.). Alternatively, multimedia component 310 may be automatically set to a particular identity based on, for example, Presence and Location information of the destination user. Multimedia component 310 may transmit this identity information to server 130, which may store the identity information. Server 130 may then look up this information based, for example, on the identifier of the destination user. In addition or alternatively, server 130 may look up other information, such as the status (e.g., operating mode) to which multimedia component 310 has been set, a current date, a current time, etc.

Server 130 may determine whether the obtained identifier of the origination user matches a stored identifier for the identity (and/or status, date, time, etc.) in which multimedia device 310 is currently operating (block 960). For example, server 130 may compare the obtained identifier for the origination user to a list of identifiers stored, for example, in database 500, that is associated with the identity (and/or status, date, time, etc.).

If the identifier matches a stored identifier for the identity (and/or status, date, time, etc.) (block 960—YES), server 130 may identify the appropriate rule to be used based on the identifier and identity in which multimedia component 310 is operating (block 970). For example, in one embodiment, server 130 may use the identity and origination user identifier to look up the appropriate rule from a database, such as database 500. Server 130 may use the rule for handling the received communication (block 970). For example, the rule may be very simple—for example, route the call directly to multimedia component 310. Alternatively, the rule may indicate that particular content (e.g., multimedia content) should be provided to the origination user and the manner in which the content should be provided. In such an event, server 130 may obtain and provide the particular content and provide the content in the identified manner (e.g., as a ringback tone, as a message, etc.). The rule may further indicate how the communication is to be treated (e.g., routed to a particular destination device 120, routed to a voicemail service, routed to a videomail service, etc.). In such an event, server 130 may terminate the communication in the appropriate manner.

In one embodiment, server 130 may modify the identified content that is sent to origination device 110 based on the capabilities of origination device 110 or the type of communication received (e.g., voice session, video session, instant message, SMS message, e-mail message, etc.). In one embodiment, server 130 may determine the capabilities of origination device 110 in a known manner (e.g., as part of the establishing the session) and remove content, convert content, etc. based on the determined capabilities. For example, if the identified content includes audio content and video content, but server 130 determines that origination device 110 is only capable of processing audio content, server 130 may only send the audio content to origination device 110. As another example, if audio content is to be provided to an origination device 110 in response to a received instant message, server 130 may, in one embodiment, convert the audio content to text and transmit the text to origination device 110 as an instant message. As yet another example, if audio/video content is to be provided to an origination device 110 in response to a received e-mail message, server 130 may, in one embodiment, attach the audio/video content as an attachment to a response e-mail message or include a link in the response e-mail message to the audio/video content.

Upon receipt of the content (e.g., multimedia content) from server 130, origination device 110 may transmit an acknowledgment message to server 130. Server 130 may store the acknowledgment message for later retrieval, viewing, etc. by the destination user. Also, the origination user may store the content received from server 130 on origination device 110 for later retrieval, viewing, etc.

If the identifier does not match a stored identifier (or if no identifier for the origination user could be obtained) for the identity (and/or status, date, time, etc.) (block 960—NO), server 130 may use a default rule for processing the communication. In either situation (e.g., where an identified rule is used for handling a communication or when a default rule is used for handling the communication), server 130 may store information relating to the handling of the communication. For example, server 130 may store information identifying the origination user and possibly the actions (e.g., storing information identifying the content provided to the origination user) taken by server 130 in handling the communication from the origination user.

Figure 10B:
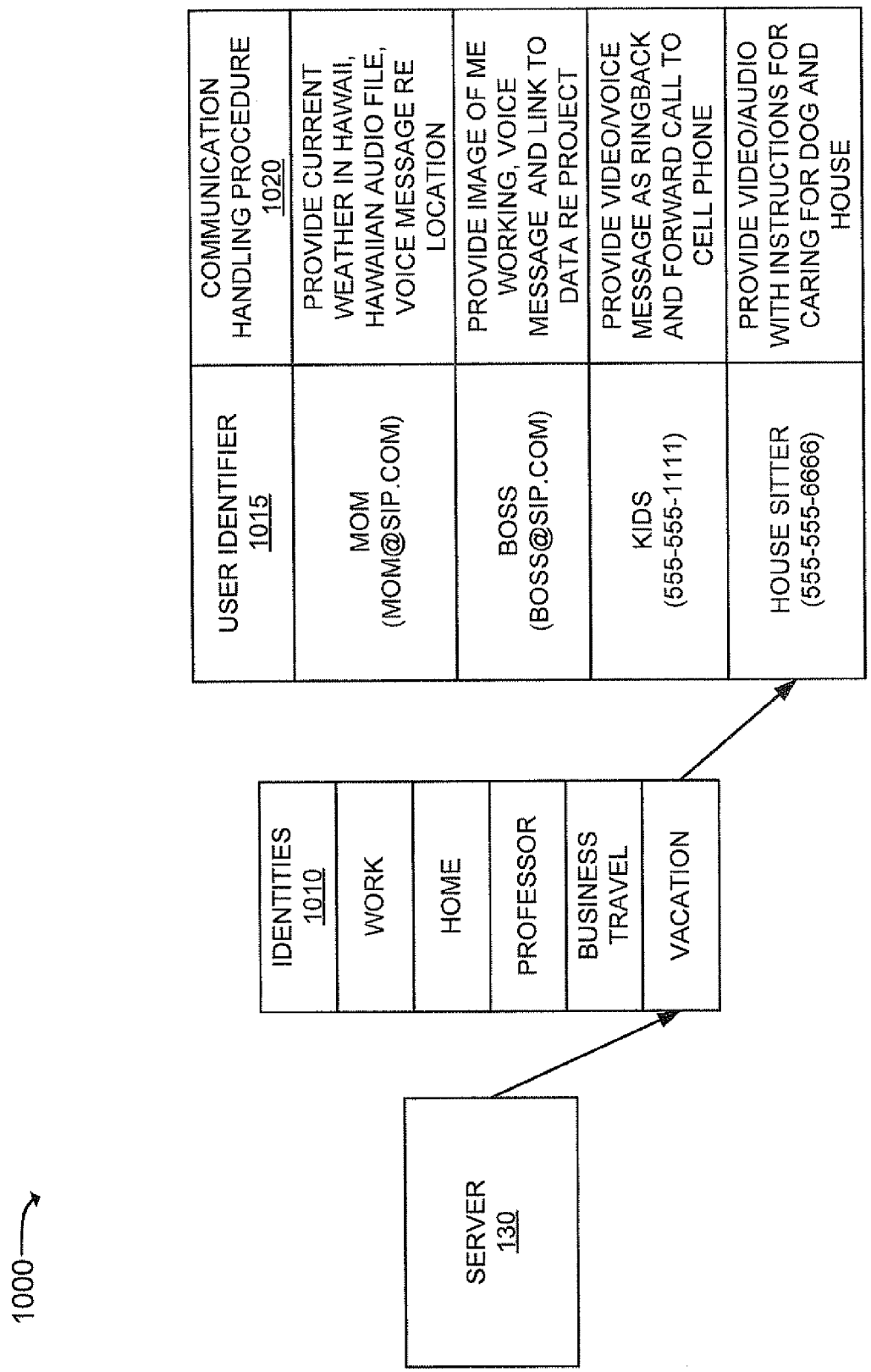
FIGS. 10A-12C illustrate examples of the exemplary process of FIG. 9.

The following example 1000 of FIGS. 10A-10F illustrates the processing described above with respect to FIG. 9. Assume that a house sitter is associated with an origination device 110, as illustrated in FIG. 10A. Assume further that the house sitter is house sitting for a destination user who is currently on vacation and has forgotten the instructions that the house sitter has been given by the destination user. In response, the house sitter may attempt to call the destination user by causing origination device 110 to transmit a communication request 1005, as illustrated in FIG. 10A. Server 130 may receive communication request 1005.

In response to receiving communication request 1005, server 130 may identify an identity 1010 in which the destination user's multimedia component 310 is currently operating, as illustrated in FIG. 10B. Assume that the destination user has set multimedia component 310 to a "vacation" mode, since the destination user is currently on vacation. Thus, server 130 would identify multimedia component 310 as in the "vacation" mode. Server 130 may, for example, look up the rules associated with the "vacation" mode. In this example, server 130 may use a user identifier 1015 (e.g., a telephone number) associated with the house sitter (e.g., obtained via an ANI operation) to lookup a communication handling procedure 1020 associated with that user identifier. In this example, communication handling procedure 1020 may indicate that a video/audio file is to be provided that includes instructions for caring for the dog and the house.

Server 130 may provide a video/audio file 1025 (that includes instructions for caring for the dog and house) to origination device 110, as illustrated in FIG. 10C. Origination device 110 may display video in a display window 1030 and provide the audio via one or more speakers. In one embodiment, the house sitter may store video/audio file 1025 for later retrieval. Additionally or alternatively, origination device 110 may send an acknowledgment message to server 130 indicating that video/audio file 1025 has been received. Server 130 may forward the acknowledgment message to multimedia component 310 or store the acknowledgment message for later viewing by the destination user.

Figure 10D:
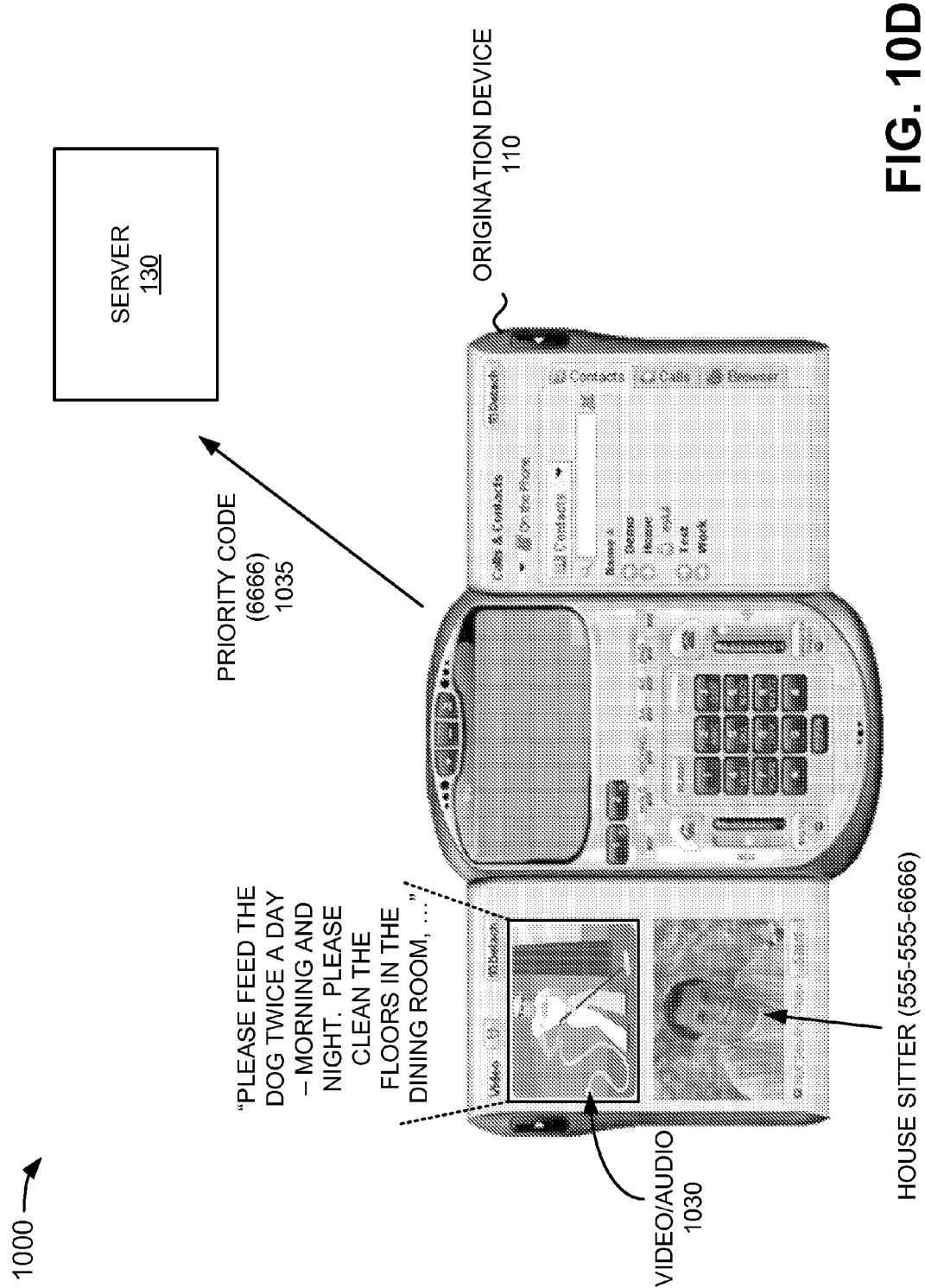
Figure 10E:
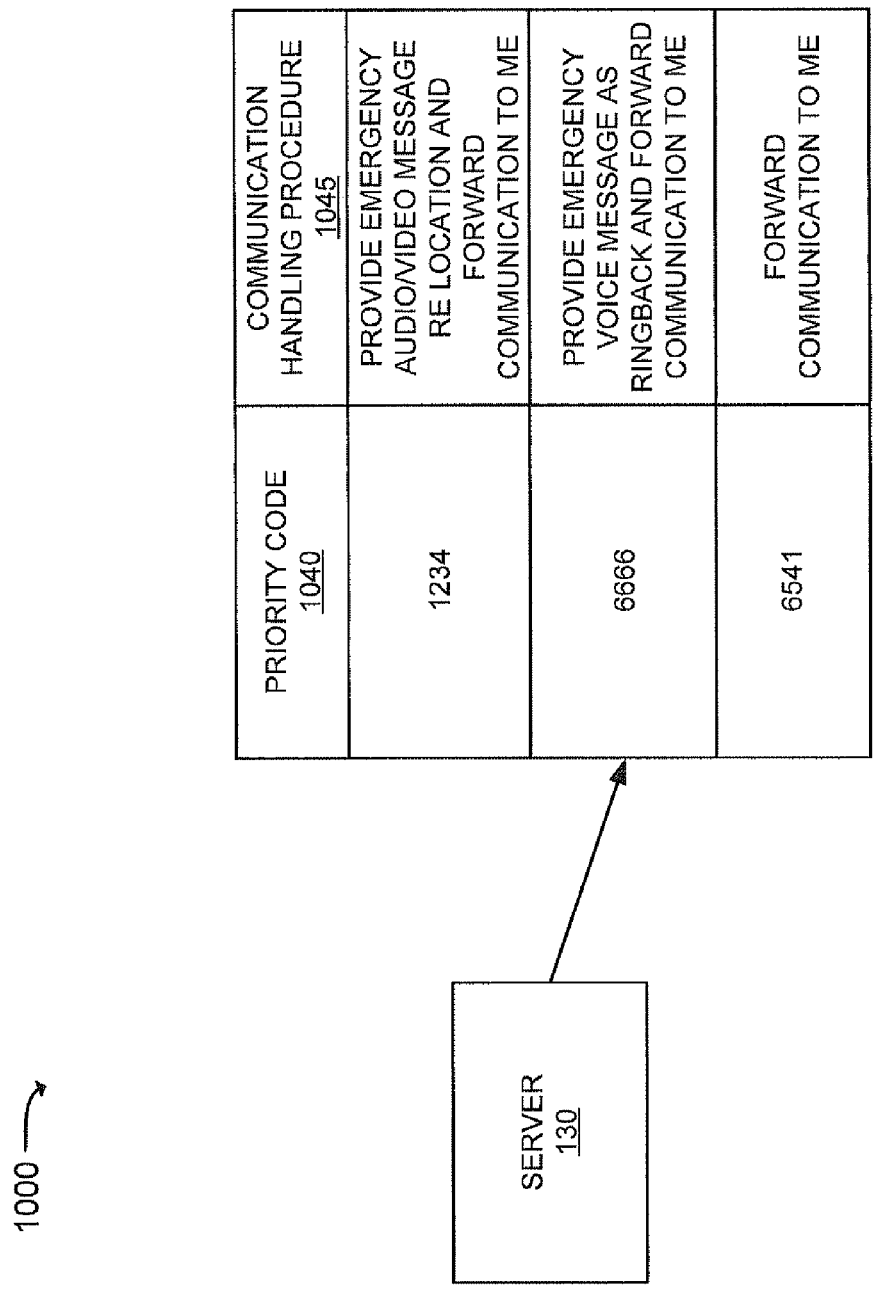

Assume that an emergency has arisen in which the house sitter needs to speak with the destination user. Thus, assume that the house sitter causes origination device 110 to transmit a priority code "6666" to server 130, as illustrated in FIG. 10D. In response to receiving priority code "6666," server 130 may lookup the priority code in a list of priority codes 1040, as illustrated in FIG. 1E. Since the priority code matches a priority code in list 1040, server 130 may retrieve a communication handling procedure 1045 that corresponds to the matching priority code. In this example, communication handling procedure 1045 indicates that an emergency voice message is to be provided to origination device 110 as a ringback tone, and a voice session is to be established to the destination user. In one embodiment, server 130 may use the user's Presence and Location information to determine a destination device 120 to which the voice session is to be established. Alternatively or additionally, server 130 may, for example, use Global Positioning Satellite (GPS) data (or other location data) to identify an appropriate destination device 120 for the destination user.

Figure 10F:
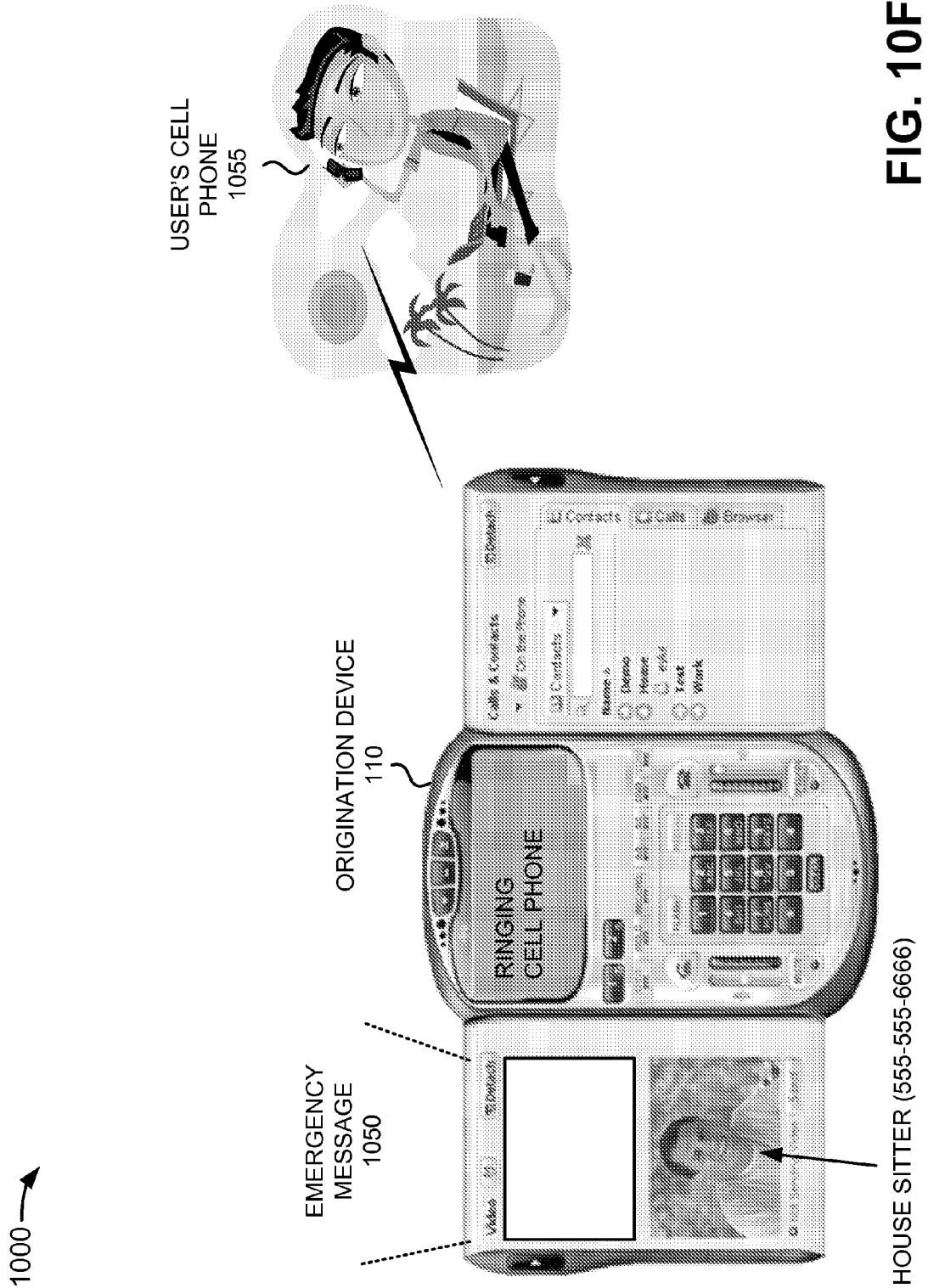

As a result, server 130 may provide emergency message 1050 to origination device 110, as illustrated in FIG. 10F. Server 130 may also cause a voice session to be established between origination device 110 and destination user's cell phone 1055.

Figure 11A:
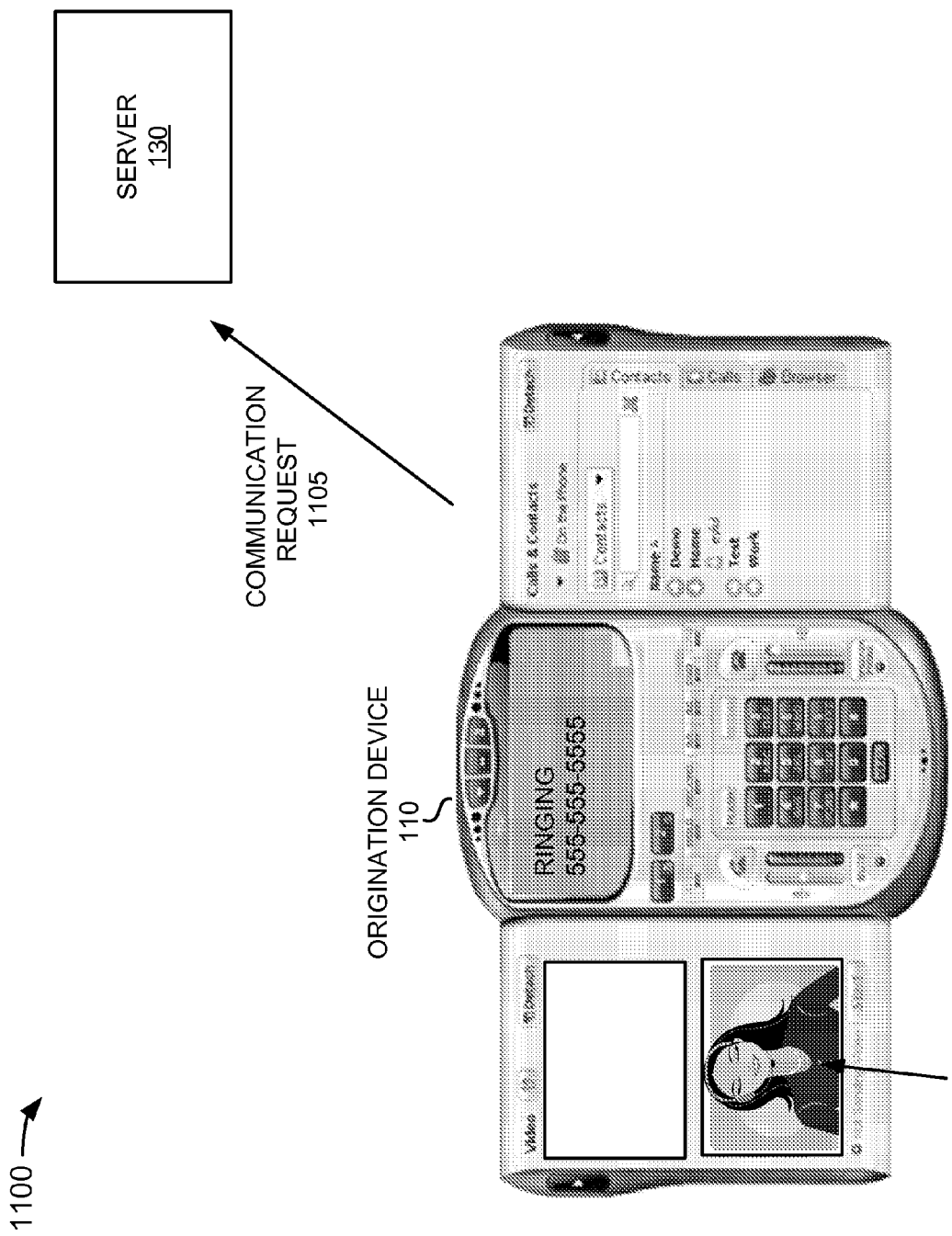
Figure 11B:
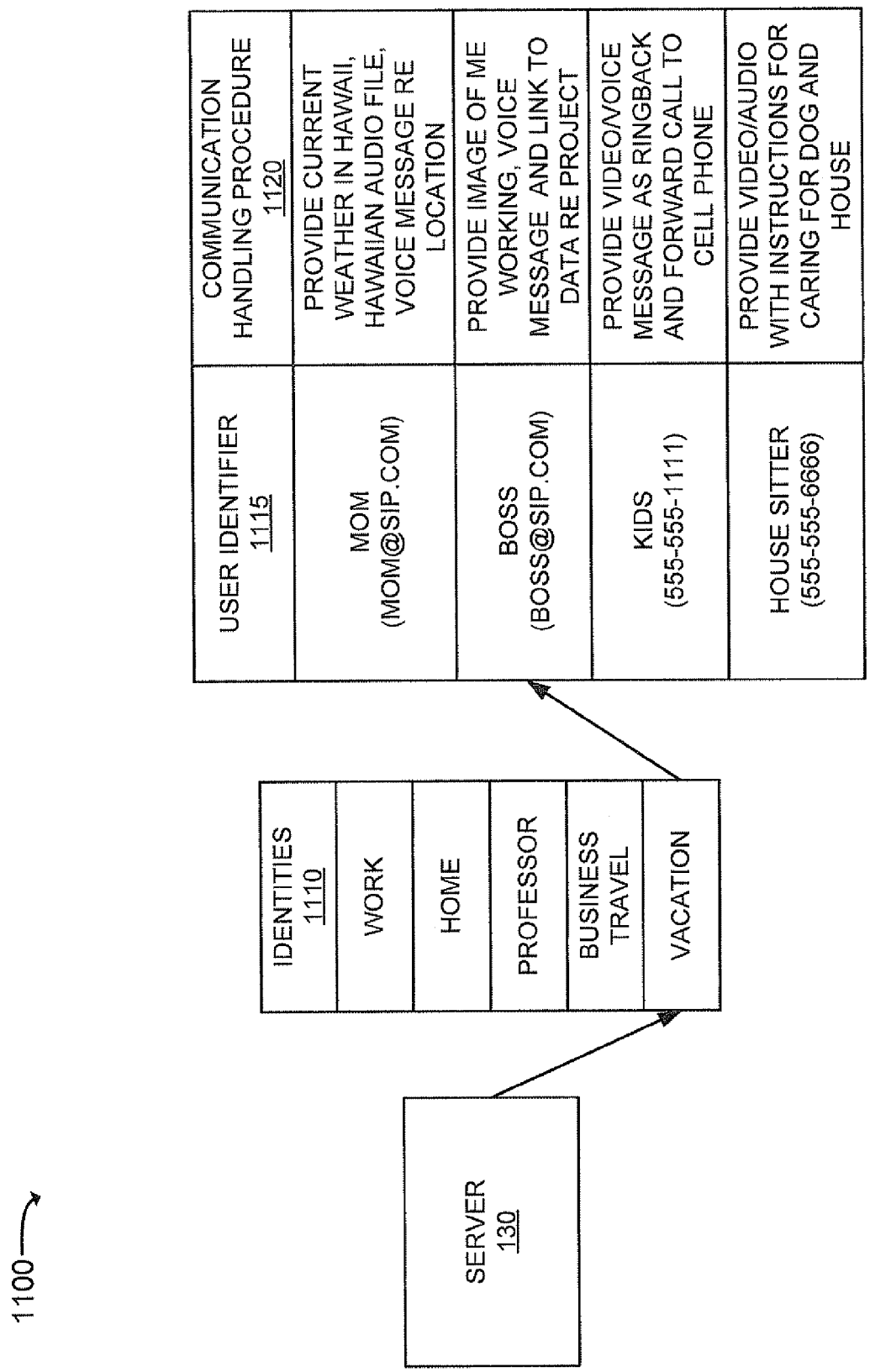
Figure 11C:
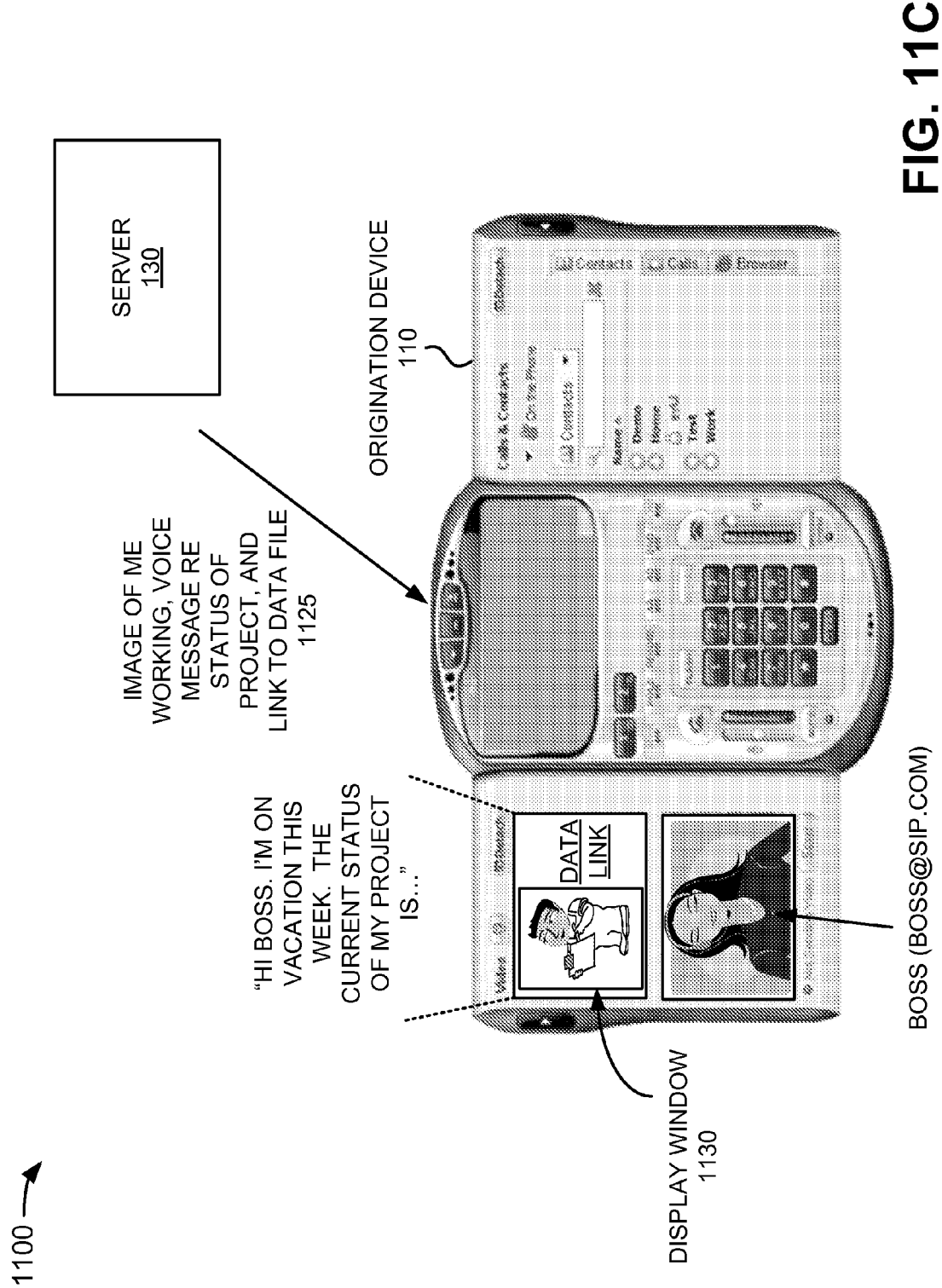

The following example 1100 of FIGS. 11A-11C further illustrates the exemplary process described above with respect to FIG. 9. Assume, as in example 1000 above, that a destination user is currently on vacation and has set the identity of multimedia component 310 to a "vacation" mode. In example 1100, assume that the destination user's boss attempts to call the destination user by causing origination device 110 to transmit a communication request 1105, as illustrated in FIG. 11A. Server 130 may receive communication request 1105.

In response to receiving communication request 1105, server 130 may identify an identity 1010 in which the destination user's multimedia component 310 is currently operating, as illustrated in FIG. 11B. Server 130 may, for example, determine that multimedia component 310 is in "vacation" mode. Server 130 may look up the rules associated with the "vacation" mode. In this example, server 130 may use a user identifier 1115 (e.g., a telephone number) associated with the boss (e.g., obtained from communication request 1105, which may be a SIP invite) to lookup a communication handling procedure 1120 associated with that user identifier. In this example, communication handling procedure 1120 may indicate that an image of the destination user working is to be provided, along with a voice message providing information relating to a project on which the destination user is working and a link to a data file relating to the project.

Server 130 may provide the identified multimedia content 1125 (that includes the image, the voice message, and the link to the data file) to origination device 110, as illustrated in FIG. 11C. Origination device 110 may display the image and data link in a display window 1130 and provide the voice message via one or more speakers. In one embodiment, the boss may store multimedia content 1125 for later retrieval. Additionally or alternatively, origination device 110 may send an acknowledgment message to server 130 indicating that multimedia content 1125 has been received. Server 130 may forward the acknowledgment message to multimedia component 310 or store the acknowledgment message for later viewing by the destination user.

Figure 12A:
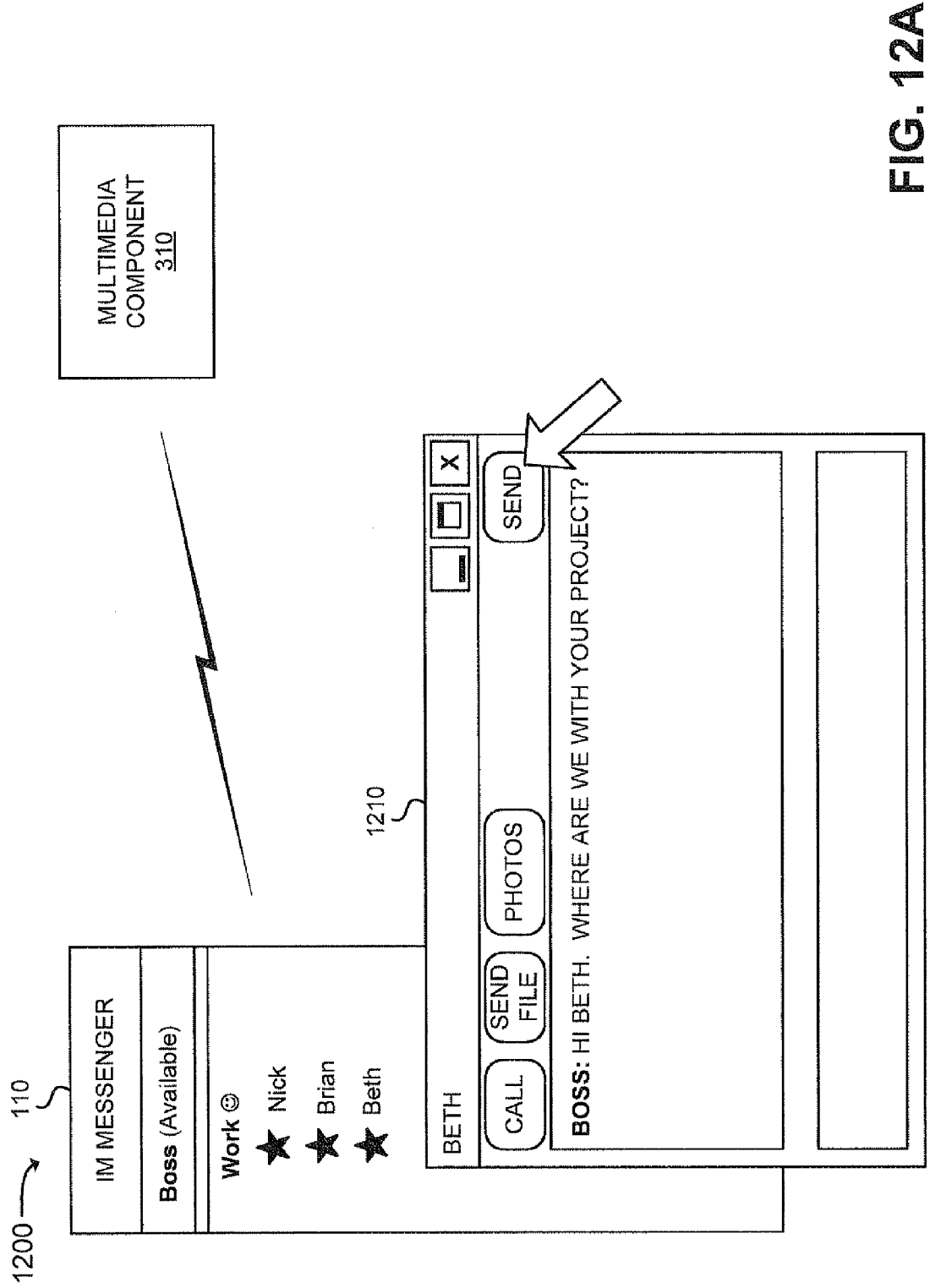
Figure 12B:
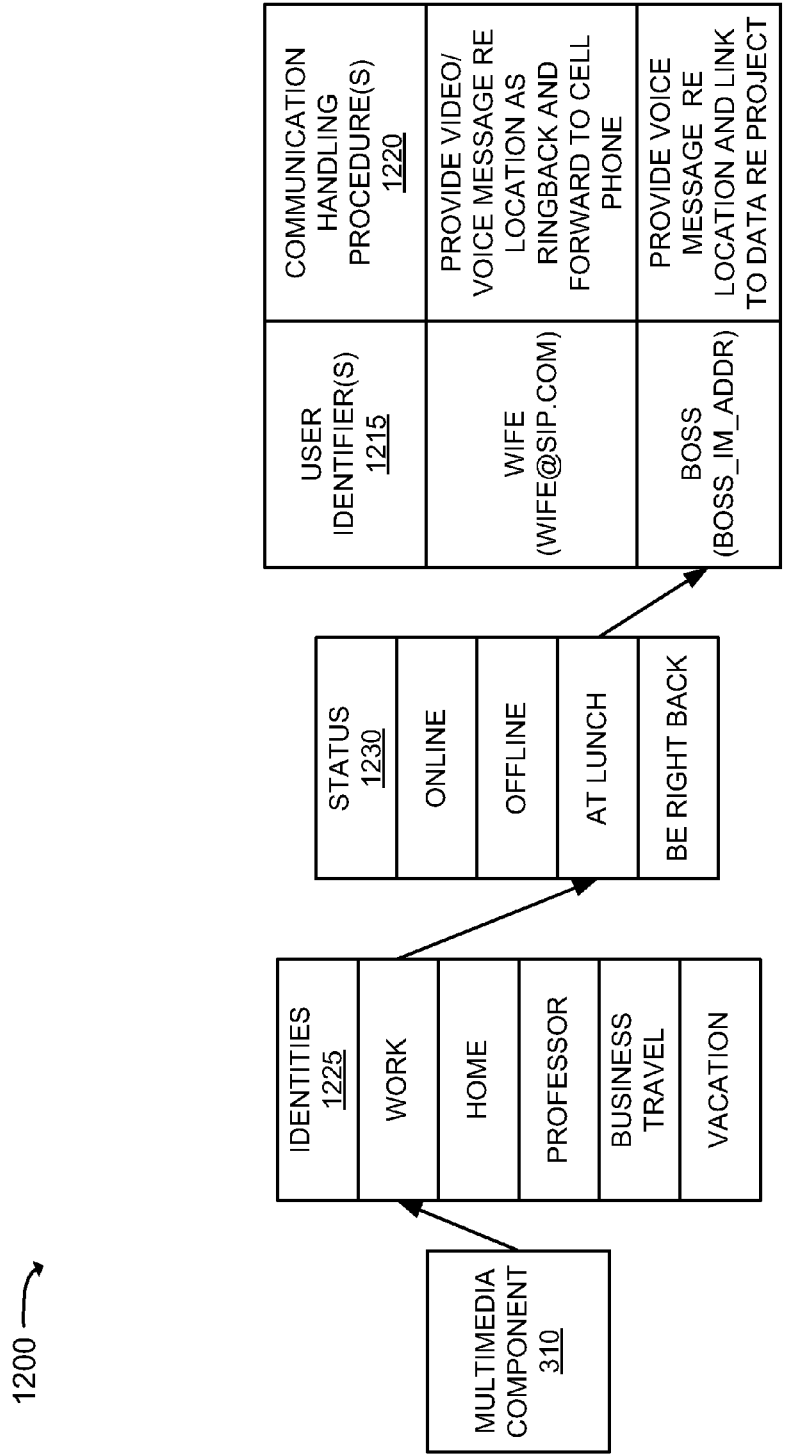
Figure 12C:
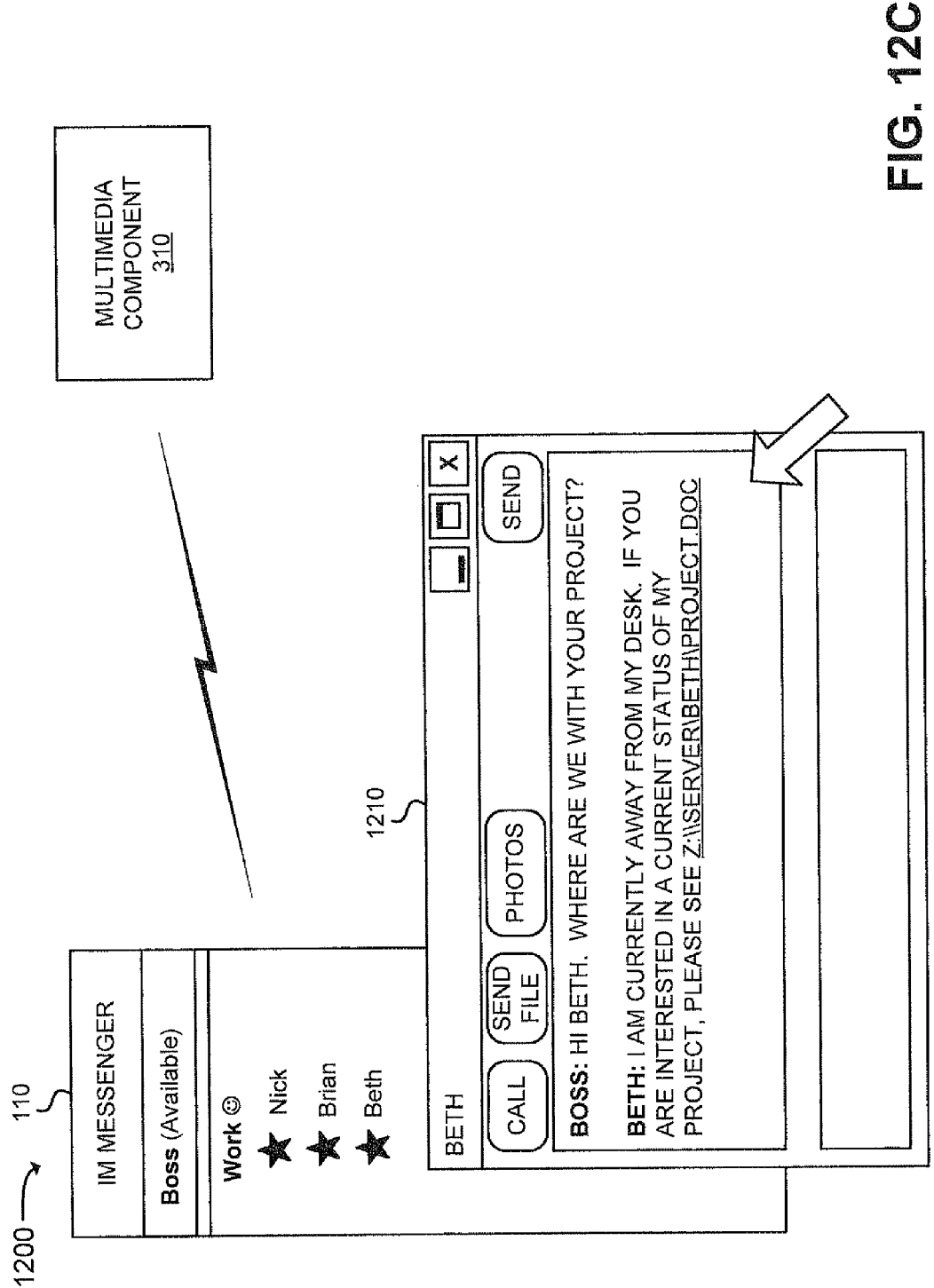

The following example 1200 of FIGS. 12A-12C still further illustrates the exemplary process described above with respect to FIG. 9. Assume that a destination user "Beth" is currently at lunch and has set the identity of multimedia component 310 to "work" and the status to "at lunch." While Beth is at lunch, assume that Beth's boss sends Beth an instant message using an instant message chat window 1210, as illustrated in FIG. 12A. Beth's multimedia component 310 may receive the instant message. A1

In response to receiving the instant message, multimedia component 310 may detect that multimedia component 310's identity 1225 has been set to "work" and multimedia components 310's status 1230 is currently "at lunch." Multimedia component 310 may look up the rules associated with the "work" mode and the "at lunch" status. In this example, as illustrated in FIG. 12B, multimedia component 310 may use a user identifier 1215 (e.g., an instant message address) associated with the boss (e.g., obtained from the instant message) to lookup a communication handling procedure 1220 associated with that user identifier. In this example, communication handling procedure 1220 may indicate that a voice message regarding Beth's location is to be provided, along with a link to a data file relating to a project on which Beth is working.

Assume, in this example, that multimedia component 310 detects the capabilities of origination device 110 and determines that origination device is incapable of processing the voice message that is to be provided. In this situation, multimedia component 310 may convert the voice message to text and provide the text message and the link to origination device 110 as an instant message, as illustrated in FIG. 12C.

Embodiments described herein provide a multimedia component that processes communication requests on behalf of a user based on a variety of factors, including an identity in which the multimedia component is operating, a status of the multimedia component, a date, a time, etc.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7 and 9, the order of the blocks may be varied in other embodiments. Moreover, non-dependent blocks may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to store:
an identifier,
a first rule for processing communications that are associated with the identifier, the first rule identifying first multimedia content that is to be provided based on receiving the communications that are associated with the identifier, the first rule being associated with a first identity,
a second rule for processing one or more communications that are associated with the identifier, the second rule identifying second multimedia content that is to be provided based on receiving the one or more communications that are associated with the identifier, the second rule being associated with a second identity that is different than the first identity, the second rule being different than the first rule, and
a third rule for processing at least one communication that is associated with the identifier, the third rule identifying third multimedia content that is to be provided based on receiving information identifying a priority situation, the third rule being different than the first rule and the second rule; and a processor to:
receive, from a first user, a communication for a second user,
obtain identification information for the first user,
determine whether another device, that is associated with the second user, is operating in the first identity or the second identity,
identify a status associated with the other device,
determine that the first rule applies to the received communication when the obtained identification information matches the identifier and the status, and the other device is operating in the first identity,
provide the first multimedia content to the first user when the first rule applies,
determine that the first rule does not apply to the received communication when at least one of: the obtained identification information does not match the first identity or the status, or the obtained identification information does not match the identifier,
determine that the second rule applies to the received communication when the obtained identification information matches the identifier and the other device is operating in the second identity,
provide the second multimedia content to the first user when the second rule applies, and
determine that the third rule applies to the received communication when the information identifying the priority situation is received from the first user, the third multimedia content being provided to the first user when the third rule applies.

2. The device of claim 1, where the received communication includes a voice session establishment request, a video session establishment request, an instant message, a Short Message Service (SMS) message, or an electronic mail message.

3. The device of claim 1, where, when providing the first multimedia content or the second multimedia content, the processor is to:
provide the first multimedia content or the second multimedia content as a ringback.

4. The device of claim 1, where the communication is received from a device associated with the first user,
where the processor is further to:
detect a capability of the device associated with the first user after receiving the communication, and
where, when providing the first multimedia content or the second multimedia content, the processor is to:
modify the first multimedia content or the second multimedia content provided to the first user, based on the detected capability of the device associated with the first user, and
provide the modified first multimedia content or the modified second multimedia content to the device associated with the first user.

5. The device of claim 1, where the processor is further to:
identify a device associated with the second user, using presence and location information associated with the second user when the third rule applies, and
route the received communication to the identified device.

6. A method comprising:
receiving, at a device, from a first user, a communication request for another device that is associated with a second user, the first user being associated with first identification information;
determining, using the device, whether the other device is operating in a first identity or a second identity that is different than the first identity, the first identity being associated with first rules, the second identity being associated with second rules that are different than the first rules;
comparing, using the device, the first identification information with identification information that is associated with the first identity or the second identity;
identifying, using the device, a status associated with the other device;
determining, using the device, that a particular one of the first rules applies to the communication request when:
the first identification information matches identification information that is associated with the first identity and the status, and
the other device is operating in the first identity;
providing, using the device, first multimedia content to the first user when the particular one of the first rules applies to the communication request;
determining, using the device, that the particular one of the first rules does not apply to the communication request when at least one of: the first identification information does not match the identification information that is associated with the first identity or the status, or the other device is not operating in the first identity,
determining, using the device, that a particular one of the second rules applies to the communication request when the first identification information matches identification information that is associated with the second identity and the status;
providing, using the device, second multimedia content to the first user when the particular one of the second rules applies to the communication request
determining, using the device, that a third rule applies to the communication request when information identifying an emergency situation is received from the first user, third multimedia content being provided to the first user when the third rule applies.

7. The method of claim 6, where at least one of the first multimedia content or the second multimedia content includes one or more of:
a voice message,
a music file,
an image file,
a video file,
a text message, or
content dynamically retrieved from a network device.

8. The method of claim 6, further comprising:
detecting a capability of a device associated with the first user;
modifying the first multimedia content based on the detected capability of the device associated with the first user; and
providing the modified first multimedia content to the first user.

9. The method of claim 6, where the third rule includes information identifying a period of time when the third multimedia content is to be provided to the device of the first user,
where the method further comprises:
identifying a device associated with the second user using presence and location information associated with the second user;
routing the communication request to the identified device associated with the second user; and
providing the third multimedia content to the first user during the period of time.

10. The method of claim 6, where the communication request includes a video session establishment request, an instant message, or an electronic mail message.

11. The method of claim 6, further comprising:
receiving the information identifying the emergency situation from the first user prior to comparing the first identification information with the identification information that is associated with the first identity or the identification information that is associated with the second identity.

12. A non-transitory computer-readable medium comprising:
a plurality of instructions which, when executed by a device, cause the device to:
store:
an identifier,
a first rule for processing communications that are associated with the identifier, the first rule identifying first multimedia content that is to be provided based on receiving the communications that are associated with the identifier, the first rule being associated with a first identity,
a second rule for processing one or more communications that are associated with the identifier, the second rule identifying second multimedia content that is to be provided based on receiving the one or more communications that are associated with the identifier, the second rule being associated with a second identity that is different than the first identity, the second rule being different than the first rule, and
a third rule for processing at least one communication that is associated with the identifier, the third rule identifying third multimedia content that is to be provided based on receiving information identifying a priority situation, the third rule being different than the first rule and the second rule;
receive, from a first user, a communication for a second user;
obtain identification information for the first user;
determine whether another device, that is associated with the second user, is operating in the first identity or the second identity;

identify a status associated with the other device;
determine that the first rule applies to the received communication when the obtained identification information matches the identifier and the status, and the other device is operating in the first identity;
provide the first multimedia content to the first user when the first rule applies;
determine that the first rule does not apply to the received communication when at least one of: the obtained identification information does not match the first identity or the status, or the other device is not operating in the first identity,
determine that the second rule applies to the received communication when the obtained identification information matches the identifier and the other device is operating in the second identity,
provide the second multimedia content to the first user when the second rule applies, and
determine that the third rule applies when the information identifying the priority situation is received from the first user, the third multimedia content being provided to the first user when the third rule applies.

13. The non-transitory computer-readable medium of claim 12, where at least one of the first multimedia content, the second multimedia content, or the third multimedia content includes one or more of:
a voice message,
an audio file,
an image file,
a video file,
a text message, or
content dynamically retrieved from a network device.

14. The non-transitory computer-readable medium of claim 12, where the received communication for the second user includes a voice session establishment request, a video session establishment request, an instant message, a Short Message Service (SMS) message, or an electronic mail message.

15. The non-transitory computer-readable medium of claim 12, further comprising:
one or more instructions to identify, using presence and location information and when the second rule applies, a network device to which the received communication is to be routed; and
one or more instructions to route the received communication to the network device.

16. The non-transitory computer-readable medium of claim 12, further comprising:
one or more instructions to detect a capability of a device associated with the first user, when the first rule applies; and
one or more instructions to modify the first multimedia content to obtain a modified first multimedia content based on the detected capability of the device associated with the first user, and
where one or more instructions, of the plurality of instructions, to provide the first multimedia content to the first user include one or more instructions to provide the modified multimedia content to the device associated with which the first user.

17. The non-transitory computer-readable medium of claim 12, where the third rule identifies a period of time during which the third multimedia content is to be provided to a device of the first user, and
the non-transitory computer-readable medium further comprising:
one or more instructions to provide the third multimedia content to the first user during the period of time, when the third rule applies.

18. The non-transitory computer-readable medium of claim 12, further comprising:
one or more instructions to receive the information identifying the priority situation prior to determining whether the other device is operating in the first identity or the second identity.

* * * * *